(12) United States Patent
Kaditz et al.

(10) Patent No.: US 11,710,179 B1
(45) Date of Patent: Jul. 25, 2023

(54) TOOLS FOR PURCHASING TRANSACTIONS

(71) Applicant: Affirm, San Francisco, CA (US)

(72) Inventors: Jeffrey Howard Kaditz, San Francisco, CA (US); Andrew Gettings Stevens, Palo Alto, CA (US); Manuel De Jesus Arias, San Francisco, CA (US); Aaron Ng Ligon, Palo Alto, CA (US)

(73) Assignee: Affirm, Inc., San Francisco, CA (US)

( * ) Notice: Subject to any disclaimer, the term of this patent is extended or adjusted under 35 U.S.C. 154(b) by 817 days.

(21) Appl. No.: 14/712,790

(22) Filed: May 14, 2015

Related U.S. Application Data

(60) Provisional application No. 62/048,186, filed on Sep. 9, 2014, provisional application No. 61/992,984, filed on May 14, 2014.

(51) Int. Cl.
*G06Q 40/03* (2023.01)

(52) U.S. Cl.
CPC .................................. *G06Q 40/03* (2023.01)

(58) Field of Classification Search
CPC ....... G06Q 40/00; G06Q 40/02; G06Q 40/025; G06Q 40/03
See application file for complete search history.

(56) References Cited

U.S. PATENT DOCUMENTS

| | | | |
|---|---|---|---|
| 7,877,326 | B2 | 1/2011 | Koch |
| 8,078,527 | B2 | 12/2011 | Cerise et al. |
| 8,145,565 | B1 | 3/2012 | Voutour et al. |
| 8,452,683 | B2 | 5/2013 | Bayne |
| 8,458,093 | B1 | 6/2013 | Smith |
| 8,892,467 | B1* | 11/2014 | Ball |
| 10,664,907 | B2 | 5/2020 | Rieger |
| 2002/0069122 | A1* | 6/2002 | Yun et al. |
| 2003/0009402 | A1 | 1/2003 | Mullen et al. |
| 2003/0036996 | A1 | 2/2003 | Lazerson |
| 2007/0106584 | A1 | 11/2007 | Irwin |
| 2009/0024478 | A1 | 1/2009 | Dixon et al. |
| 2011/0313919 | A1 | 12/2011 | Evans et al. |
| 2012/0059757 | A1* | 3/2012 | Hurwitz et al. |
| 2012/0233014 | A1* | 9/2012 | Banks et al. |
| 2012/0330744 | A1* | 12/2012 | Aissa |
| 2013/0179338 | A1 | 7/2013 | Evans |
| 2013/0185189 | A1* | 7/2013 | Stewart |
| 2013/0339219 | A1* | 12/2013 | Bernheimer et al. |
| 2014/0012737 | A1 | 1/2014 | Evans |
| 2015/0206234 | A1* | 7/2015 | Forrester et al. |
| 2015/0278948 | A1 | 10/2015 | Don et al. |
| 2016/0171555 | A1 | 6/2016 | Buerger et al. |

OTHER PUBLICATIONS

Final Office Action from related U.S. Appl. No. 15/391,119 mailed on Apr. 9, 2021, all pages cited in its entirety.
Naujeck, Jeanne, "Lenders offer easire ways to finance remodel", The Tennessean, Nashville, Tenn, Sep. 9 (Year: 2006).
Notice of Allowance from related U.S. Appl. No. 14/920,573 mailed on Feb. 5, 2021, all pages cited in its entirety.
"Borrowers out to know how much they are being penalized", Daily Herald; Arlington Heights, III, May 11 (Year: 2013).
Gerald Haubl et al., Consumer Decision Making in Online Shopping Environments: The Effects of Interactive Decision Aids, Feb. 1, 2000, Marketing Science, https://doi.org/10.1287/mksc.19.1.4.15178. (Year: 2000).*

* cited by examiner

*Primary Examiner* — Bennett M Sigmond
*Assistant Examiner* — George N. Proios
(74) *Attorney, Agent, or Firm* — Burr & Forman LLP

(57) ABSTRACT

Financing tools can provide a flexible credit services to customer. A credit service provider can collect personal data from clients that can include a mobile telephone number and a legal name of the client as well as purchase information from a merchant. Based upon the collected data, the system can determine a client credit risk. The system can make a credit decision to offer a client credit to purchase goods or services based upon the credit risk.

17 Claims, 39 Drawing Sheets

$600 credit approval on a $1,000 purchase. Select interest terms.

Downpayment Amount: $200 | $400 (231) | $600 | $800

Interest: 1% | 2% | 3% | 4% | 5% (233)

Loan Amount: $200 | $400 | $600 (235) | $1,000

Number of Years: 1 | 2 | 3 | 4 | 5 (237)

Number of Payments: 1 | 5 (238) | 10 | 15 | 20

Payment Interval: Days | Weeks | Bi-weekly | Months | Years (239)

Continue (221) | Increase Downpayment (223) | Provide More Information (225)

$400 credit approval on a $1,000 purchase. Select interest terms.

| $200 | $400 | $600 (162) | $1,000 |

Downpayment Amount

| 1% | 2% | 3% (164) | 4% | 5% |

Interest

| $200 | $400 (166) | $600 | $1,000 |

Credit Amount

| 1 | 2 | 3 | 4 | 5 (170) |

Number of Years

| 1 | 5 (168) | 10 | 15 | 20 |

Number of Payments

| Days | Weeks | Bi-weekly | Months | Years (169) |

Payment Inteval

[Continue] 221  [Increase Downpayment] 223  [Provide More Information] 225

$600 credit approval on a $1,000 purchase. Select interest terms.

| $200 | $400 | $600 | $1,000 |

Downpayment Amount

| 1% | 2% | 3% | 4% | 5% |

Interest

| $200 | $400 | $600 | $1,000 |

Loan Amount

| 1 | 2 | 3 | 4 | 5 |

Number of Years

| 1 | 15 | 30 | 45 | 60 |

Number of Payments

| Days | Weeks | Bi-weekly | Months | Years |

Payment Inteval

[ Continue ]   [ Increase Downpayment ]   [ Provide More Information ]

FIG. 17

✓ BASIC INFO    ② BILLING & SHIPPING    ③ REVIEW ORDER

BILLING AND SHIPPING

🔒 This is a secure 256-bit SSL encrypted payment.

✓ Enter your code to use your $250 and pay in 90 days.
[ ] [Verify]
Didn't receive it? Resend Code 317  325  323

CREDIT CARD

Cardholder Name *
[ ]

Credit Card number *
[ ]
◯ ◯ ◯ [VISA]

Expiration Date*
[Month ▼] / [Year ▼]

Security Code (CVV)
[ ]

Billing Zip Code *
[ ]

| YOUR ITEMS (3) | ✎ |
|---|---|
| ▢ Brow Envy Kit | 1 |
| ◯ Lip Balm | 1 |
| ⬭ Eyeliner Gel 74 | 1 |

— 319

ORDER SUMMARY
∘∘∘

Subtotal:              $ 68.00
New Customer Discount: -10.00
Shipping: ⊘            Free
Order Total            $58.00

— 321

SHIPPING ADDRESS ships with FedEx within the United States.
Orders placed before 7pm PST M-F ship the same day with 2-3 daty shipping or faster.

Full Name *
[Full Name]

Address *
[Street address]

Address Line 2
[Apartment, suite, unit, building, floor, etc]

City *
[ ]

FIG. 21

✓ ② ③
BASIC INFO   BILLING & SHIPPING   REVIEW ORDER

BILLING AND SHIPPING

🔒 This is a secure 256-bit SSL encrypted payment.   327

✓ You are using $58 from Affirm for this purchase.
Finish your checkout to complete your order.

Your Pay Later balance is due in 90 days on 02/11/14.
Remember, you have $192 you can still use later until11/14/14

| YOUR ITEMS (3) | ✏ |
|---|---|
| Brow Envy Kit | 1 |
| Lip Balm | 1 |
| Eyeliner Gel 74 | 1 |

SHIPPING ADDRESS ships with FedEx within the united States.
Orders placed before 7pm PST M-F ship the same day with 2-3 daty shipping or faster.

Full Name *
[Full Name]

Address *
[Street address]

Address Line 2
[Apartment, suite, unit, building, floor, etc]

City *
[City]

State *
[Select a State ▼]

Zip Code *
[Zip Code]

Phone Number *
[For Delivery Purposes]

329 — [PAY LATER]
331 — [DUE NOW]

| ORDER SUMMARY | |
| ••• | |
| Subtotal: | $ 68.00 |
| New Customer Discount: | -10.00 |
| Shipping: ⊘ | Free |
| Pay in 90 days: | $ 58.00 |
| Order Total | $0.00 |

FIG. 22

| | 553 | 555 | 557 | 551 | 559 |
|---|---|---|---|---|---|
| | 02/19/14 | Visa - 4242 | N4OZPV-Q4 | | +$12.55 @ |
| | 02/19/14 | Visa - 4242 | O2YBYM-NY | | +$225.18 @ |
| ● | 02/19/14 | Visa - 4242 | K2BXRH-WA | 565 | +$17.82 @ |
| | 02/19/14 | Visa - 4242 | OOVFBZ-KF | | +$274.82 @ |
| | 02/19/14 | Nathan's | A4K8-B7V0 | | -$500.00 @ |
| ● | 02/19/14 | Brett's Beanie Babies | 6QW1-X0Q9 | 561 | -$4.90 @ |
| ● | 02/19/14 | Alex's Air Drums | J6F2-X1WY | 563 | -$12.92 @ |

TOOLS FOR PURCHASING TRANSACTIONS

CROSS REFERENCE TO RELATED APPLICATIONS

This application claims priority to U.S. Provisional Pat. Application No. 61/992,984, "Tools For Purchasing Transactions" filed May 14, 2015 and U.S. Provisional Pat. Application No. 62/048,186, "Tools For Purchasing Transactions" filed Sep. 9, 2015 which are both hereby incorporated by reference in their entirties.

BACKGROUND

When purchases are made by customers from merchants, the typical transaction involves selecting the goods or services and paying for them with traditional means such as cash, checks, credit cards or debit cards. These traditional means are not adjustable and if credit cards are used, a very high fixed interest rate can be charged. Thus, there is very little flexibility available when the customer needs purchasing credit. What is needed is a system that provides an improved system and method for providing purchasing credit for customers to purchase goods and services from merchants.

SUMMARY OF THE INVENTION

The present invention provides a flexible system and method for providing financing tools to customers and merchants. The system can initiate a credit process and proceed to collect data from the customer such as mobile phone number, full legal name, email address, birthday, at least a portion of the social security number, etc. The system can then collect data from the merchant such as: merchant identification, items being purchased, etc. The system can also collect data from the credit provider.

The credit being provided can be customized for the customer, merchant and credit provider in various different ways. For example, different types of offered financing terms can include: the amount of credit being offered to the customer, the financing terms (duration, number of payments, payment dates, interest, etc.), group offers, merchant subsidies, etc. In different embodiments, customers and/or merchants can use tools to provide various types of credit at any time before, during or after a purchasing transaction. Customers with higher estimated credit determinations or creditworthiness can be given better financing terms including: higher total credit, extended duration of payments, extended number of payments, flexible payment dates and lower interest rates than customers with lower estimated credit determinations.

In different embodiments, the system can provide a loan for a purchase based upon a minimal amount of user information such as a name and a mobile phone number. However, in some embodiments, the system may not provide a sufficient loan to cover the entire cost of the desired purchase. In traditional purchasing systems, such as credit cards, the transaction would simply be cancelled and the user would have to find an alternative means for paying for the entire purchase or not make the purchase at all. In contrast, the inventive system can allow for a user to make a purchase based upon a partial loan for the purchase. For example, if the total purchase is for $1,000 and the maximum loan credit allowed by the system is $600, the system will allow the user to provide a $400 down payment to immediately complete the purchase.

The down payment can be provided through various means. For example, the down payment could be provided in cash, for example cash paid at a store for an online transaction by the user. Alternatively, the down payment can be money from a bank account, a debit card, a prepaid card, a gift card, a credit card, a business line of credit, a return store credit, a barter transaction, or any other monetary source.

In some embodiments, the system can further adjust the loan terms based upon increasing the down payment or by submitting additional information about the user. For example, the system user interface can display an initial set of loan terms that include a loan amount, interest and repayment information. The user interface can also include buttons for adding more money to the down payment and/or adding more information about the user. If the user decides to add more down payment money to the purchase the system can improve the loan terms for example by reducing the loan interest rate or increasing the loan repayment duration. If the user decides to add more information, the system can analyze the user information and make some predictions about the credit worthiness of the user. The additional user information can include: bank account, social network, home phone number, credit card, home address and/or employer information. With this additional user credit information, the system can adjust the loan terms which can include changes to the interest rate, credit loan amount and/or repayment duration. In some cases the additional user information that can suggest that the user is not a good credit risk which can result in less favorable loan terms.

In various embodiments, the system may have Universal Installments that provide a plurality of basic purchasing tools. If a customer is offered credit, the customer can select additional custom terms. These additional terms can include: the number of payments, payment dates, payment intervals, financing fees, and scheduling of those payments. For example, the payments can be made each month for the next 3 months, or in other embodiments the 3 payments can be made on months 1, 7 and 8. The payments can include traditional fee calculations which can be listed as interest rates or APRs, upfront service fees which can be either flat fees or fees computed as a percentage of the credit or upfront fees linked to an interest rate calculation, late fees as either a flat fee or percentage of the credit. The presentation of the fee calculations is designed to make the transaction more transparent to the customer, and to help the customer understand the loan terms that they are signing up for and how much the loan repayment will cost. The goodwill among customers from such transparency is anticipated to be an advantage.

In an embodiment, when a purchase is divided up into multiple installments, the interest and fees can be pre-computed at the time of the loan. The interest and fees can be added to the principal and divided into equal monthly payments which can be called the "upfront interest calculation." In another embodiment, the purchase could be divided into multiple installment payments, and the interest and fees calculated with a daily/monthly compounding period which can be called the "iterative interest calculation." To the user, these calculations may appear similar with equal monthly payment and interest rates. However, differences become apparent in the case of early payment and the interest rebate due to the user in these situations.

In an embodiment, when the system accounting calculations are done, the statement or credit repayment time length can be variable and does not need to comply with normal payment schemes. Thus, a 30 day close may not be necessary. In contrast, a credit card typically requires a set 30 day close, and interest is charged on the average balance. To generate a current statement for a customer account, the terms of every purchase and/or transaction can be summed by the system to capture the current balance, and future payments and fees and balances can be projected. Additionally, credit statements having similar variable payment time lengths can be set up for any type of transaction such as: groceries, gas, clothing, etc., or from specific merchants such as: Amazon, 1800 Flowers, etc., or from sub-accounts such as son and daughter sub-accounts from a parent primary account.

In an embodiment, the back end accounting system for transaction/credit statements can have specific features. An underlying credit provider system can manage payment terms for any number of transactions or groups of transactions in any payment configuration. For example, the system can process multiple installments in order to pay for a single purchase as a group of transactions. The back end can manage interest on the per purchase level, the per transaction level, and/or the per payment level and can be used to compute and/or derive more complex instruments or payment plans by combining groups of transactions. Payment plans to repay the loan can be adjusted at will by adjusting the group of purchases, transactions and/or payments to reflect changes to the payment plan, payments made, changes to the service or product purchased, or any other information.

In an embodiment, a merchant can use a line of javascript code to call a script hosted by a credit service provider to execute a checkout system. The credit service provider can process the customer information and if the customer is approved for credit or pays for the transaction, the credit service provider can issue a prepaid debit card number generated by the credit service provider for the amount of the transaction and the debit card number can be accepted by the backend payment software of the merchant without any modification. For example, if a merchant backend payment system can accept debit or credit cards, the debit card number generated by the credit service provider can be used with no change to the existing backend payment processing system.

In an embodiment, calculations can be performed for each transaction to make it easier for the consumer to understand the amounts and timing of the loan interest payments. The credit payments can be computed and displayed as a fee, instead of displayed as an interest rate or displayed as an interest rate, depending upon the customers' preferences which can be selected through a preferences user interface. Custom statements can be created for each user. These custom user statements can include for example: variable length statements of any date range from entire account history to past month, past week, past 3 days or past day. The groups of payments can be treated as individual transactions with different due dates, and the fees can be independently computed by the system. The payments and fees can be combined into a custom statement for a statement time period. This is substantially different than having the payments being lumped together for fee calculation and accounting computations which occur when using a traditional credit card. Also, in contrast to a traditional credit card that has a single balance, in an embodiment the inventive system can provide the user with custom credit statements that can include multiple balances financed at different interest rates, and/or different payment periods.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 6 illustrates an embodiment of a flowchart for using the system for making a credit funded purchase.

FIG. 7 illustrates an alternative embodiment of a flowchart for using the system for making a credit funded purchase.

FIG. 9 illustrates an embodiment of a user interface for using the system for controlling the amount of customer requested credit.

FIGS. 13 and 14 illustrate an embodiment of a user interface that includes adjustable loan terms.

FIG. 17 illustrates an embodiment of a user interface that includes adjustable loan terms based upon the revised credit and loan terms.

FIG. 21 illustrates an embodiment of a user interface with credit verification and credit card inputs and purchase information.

FIG. 22 illustrates an embodiment of a user interface with a credit approval message with a credit amount and repayment terms.

FIG. 37 illustrates an embodiment of a purchase information statement produced by a credit term processor accounting system.

DETAILED DESCRIPTION

The present invention is directed towards systems and methods for facilitating purchasing transactions that can be used to provide customized and flexible purchase and credit transaction terms. In contrast to these traditional credit methods, the inventive system can provide a wide range of payment terms that are substantially different than the traditional payment means. The inventive system can adapt to an individual customer's unique cash flow situation to provide a loan that best fits the customer's ability to repay the loan.

Figure 1:
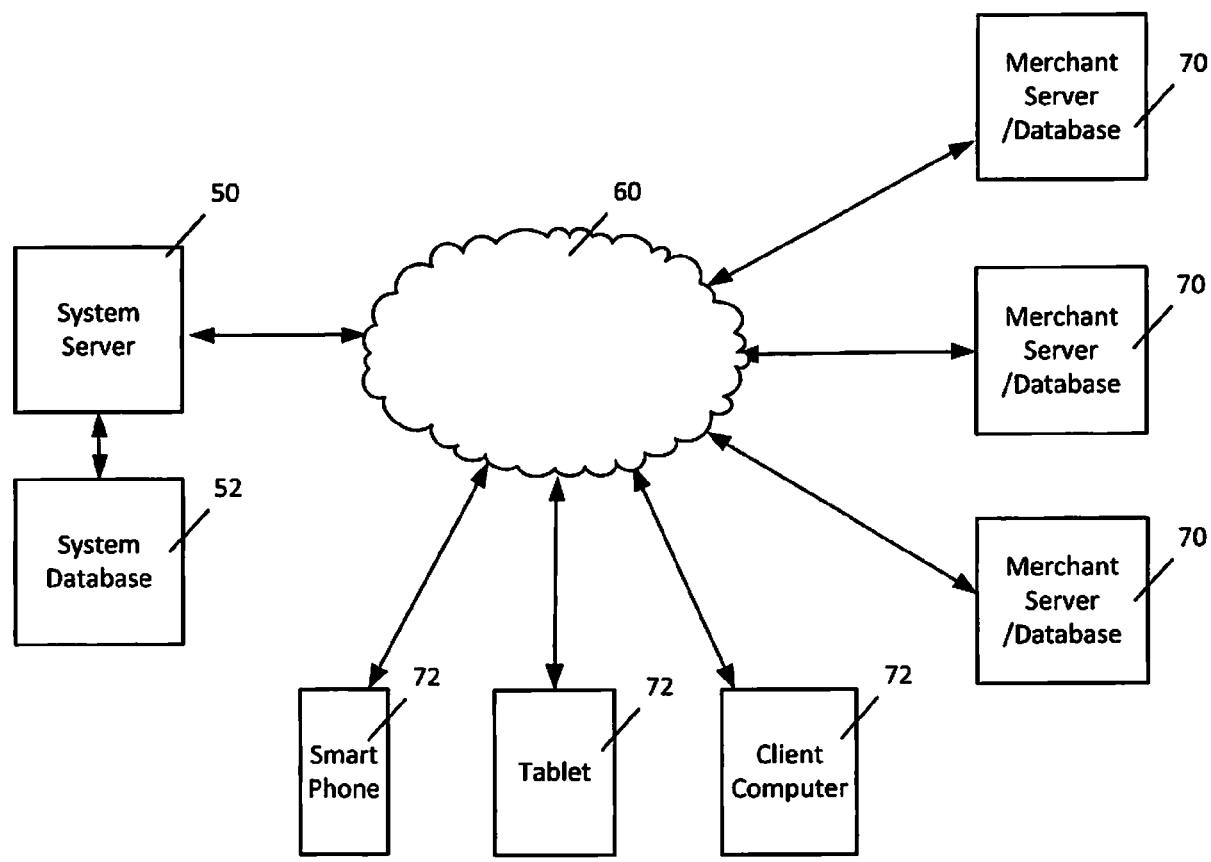
FIG. 1 illustrates a block diagram of an embodiment of a system for facilitating purchasing transactions.

Aspects of the one or more embodiments described herein may be implemented on one or more computers executing software instructions. The computers may be networked in a client-server arrangement or similar distributed computer network. With reference to FIG. 1, in an embodiment, the inventive system can include a system server 50, which is used with a plurality of mobile devices 72. The system server may work with other merchant and service provider servers 70 to process communications from the mobile devices 72. For example, in an embodiment, the system server 50 can provide a "white-label" for other merchant servers/databases 70. The system server 50 may have a system database 52 for storing information about the users and the mobile devices 72. The system server 50 can also communicate with other merchant servers/databases 70 to obtain information and verify information about the mobile devices 72 and the users of the mobile devices 72. The server 50 is coupled, directly or indirectly, to one or more merchant servers/databases 70 and a plurality of mobile devices 72 through a network. The network interface between server 50, merchant servers/databases 70 and mobile devices 72 may include one or more routers that serve to buffer and route the data transmitted between the server and client computers. The network may be the Internet, a Wide Area Network (WAN), a Local Area Network (LAN), or any combination thereof.

Figure 2:
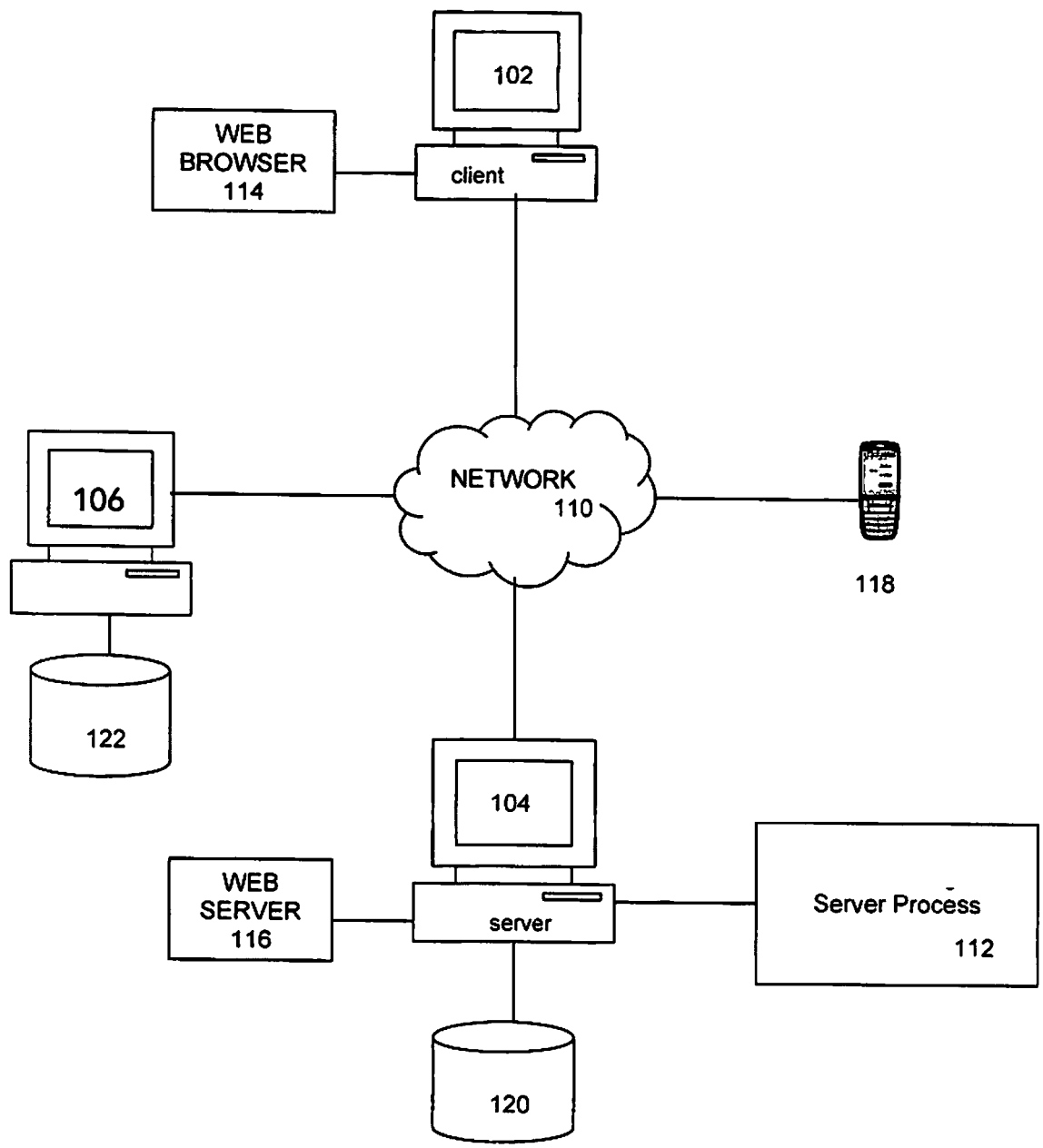
FIG. 2 is a block diagram of a computer network system that implements embodiments of a distance-based advertising delivery system.

In one embodiment with reference to FIG. 2, the system server 104 is a WorldWide Web (WWW) server that stores data in the form of web pages and transmits these pages as Hypertext Markup Language (HTML) files over the Internet 110 to the client computer(s) 102, 118. For this embodiment, the client computers 102, 118 typically runs a web browser program 114 to access the web pages served by system server 104 and merchant servers 106 and merchant databases 122.

In one embodiment, a system server 104 in network system 100 is a server that executes financing for the purchase of goods and/or service processing on the client computers 102, 118. Server process 112 may represent one or more executable programs modules that are stored within network server 104 and executed locally within the server. Alternatively, however, it may be stored on a remote storage or processing device coupled to server 104 or network 110 and accessed by server 104 to be locally executed. In a further alternative embodiment, the sales process 112 may be implemented in a plurality of different program modules, each of which may be executed by two or more distributed server computers coupled to each other, or to network 110 separately.

For an embodiment in which network 110 is the Internet, system server 104 executes a web server process 116 to provide HTML documents, typically in the form of web pages, to client computers coupled to the network. To access the HTML files provided by server 104, client computer 102 executes a web browser process 114 that accesses web pages available on server 104 and other Internet server sites, such as supplemental servers which may also be a network computer. The system server 104 can provide a "white-label" for other merchant servers 106 that can sell goods or services to clients. Alternatively, in an embodiment, the system server 104 can provide financing to clients 102, 118 that can be independent of transactions with the merchant servers 106. The merchant servers 106 can be coupled to merchant databases 122 that store merchant information. The client computer 102 may access the Internet 110 through an Internet Service Provider (ISP). Data for any of the customers, goods and services purchased, and merchants may be stored by a data store 120 that is closely or loosely coupled to any of the server 104 and/or client 102.

The client computers 102, 118 may be a smart phone or another computing device such as a computer, personal digital assistant, or similar computing device that provides access to the Internet network 110 and a sufficient degree of user input and processing capability to execute or access any required client-side application. More specifically, the client computers 102, 118 include a processor, memory, input and display. The client computers 102 and 118 may be coupled to the server computer 104 over a wired connection, a wireless connection or any combination thereof. The client computer 118 can include a touch screen display which can function to display user interfaces with loan information and provide an input mechanism for load adjustments.

In addition to providing communications between the system components, the inventive system can also control and monitor the transfer of funds between the financing service provider, merchants and client customers. For example, when customers use credit from the financing service provider, the merchant can be paid directly by the financing service provider by any means such as: electronic funds transfers, wire transfers, checks, or any other payment methods. When customers repay the financing used to make a purchase, the payments from the customer clients to the financing service provider can similarly be through: electronic funds transfers, wire transfers, checks, automated checking payments or any other payment methods.

The inventive systems and methods can be used in combination with purchasing systems described in U.S. Pat. Application No. 14/573,334, "System and Method of Transacting" filed Dec. 17, 2014, which are hereby incorporated by reference in its entirety. The inventive system and method is used for providing financial services for instantaneous credit for financial transactions, which can include purchasing goods or services. The "credit determination" can be a pre-approval process for shopping at a merchant website or physical store, enabling the merchant to offer, or enabling a customer to ask for credit before or during or after shopping. An offer for potential credit is presented to or accessed by the customer and the customer can "apply for credit" using their phone number and/or other identifying information, regardless of whether or not the customer has shopped with a merchant or the credit provider's payment system before. The credit provider can take the user's identifying information, and/or the merchant information and/or the transaction information (e.g. items already in cart, or items previously purchased) and can provide credit for that customer to spend at that merchant. Credit determination can be based upon customer information such as: FICO score, financial history such as bank/credit accounts, employment duration, job title, mobile phone information, and/or other available information. The customer information may be stored on credit provider databases. In an embodiment, the credit can be contingent upon specific products or services and possibly further limited to specific products or sale items.

The credit provider may require customers with extremely low estimated credit determinations to provide additional information such as a credit card or bank account number before credit is offered. If the customer already has a personal account with the credit provider, the customer can log into the credit provider's website to access the customer's existing account using the passwordless login system. In an embodiment, the system may store customer account information and may allow customers to access their account information through a passwordless login system such as the system described in U.S. Provisional Application No. 14//578,353, "System and Method For Passwordless Login" filed Dec. 20, 2014, which is hereby incorporated by reference in its entirety.

Figure 3:
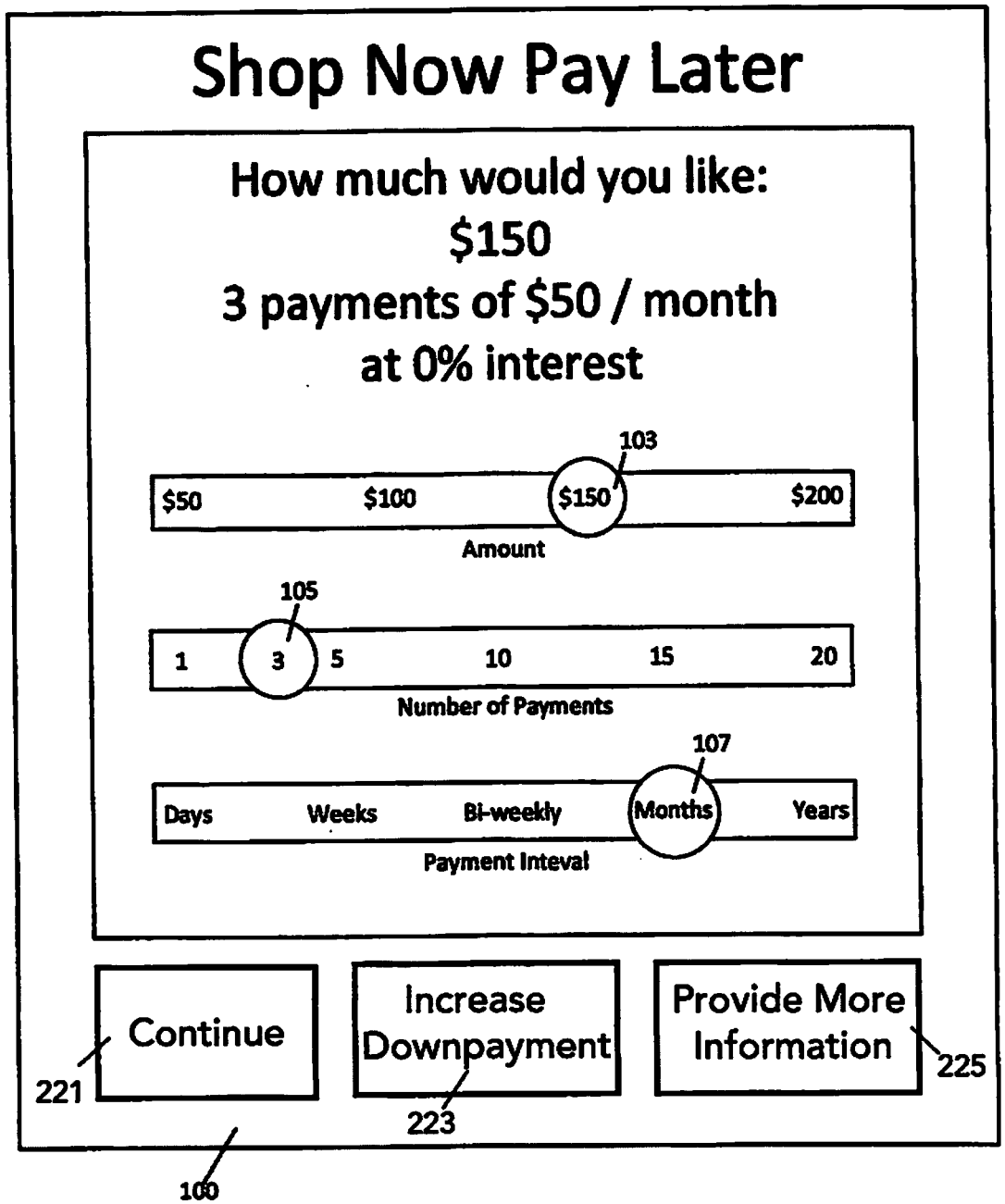
FIG. 3 illustrates an embodiment of a user interface that includes credit and payment controls.

When making a purchase, the system may interact with a mobile computer, such as a smart phone, and provide a graphical user interface that allows instant credit repayment terms to be changed. For example, with reference to FIG. 3, an example of a graphic user interface 100, that includes credit and payment controls, is illustrated. In this example, a credit of $200 is authorized for a customer. The user interface can include a credit amount slide button 103 that allows the customer to control the amount of credit being accepted. In this example, the credit accepted can range from a minimum value of $50 to a maximum value of $200. These values can be displayed with the credit amount slid button 103 so that the user knows how to control the value amount. In other embodiments, the minimum credit can be controlled by the minimum transaction value allowed by the credit provider. Similarly, the maximum value can be determined by the maximum credit authorized by the credit provider. In this example, because the user has elected to accept $150 in credit, the system can display the value of $150 as the amount the user would like to borrow.

In an embodiment, the system can also display a number of payments slider button 105 that allows the user to change the number of payments required to pay back the $150 credit. In this example, the payment options may include any number of payments between 1 and 20. In this example, the user has selected 3 payments and the graphical user interface 100 can display the text, "3 payments". The system can change the number of payments and calculate the value of the payments based upon the selected number of payments. For example, if the user selects 1 payment, the system can display, "1 payment of $150," and if the user selects 10 payments, the system can display, "10 payments of "$15". The number of payment months may increase as the number of payments slider button 105 is moved from the left side to the right side of the display. In this example, the customer may not be charged any interest for the credit because the repayment term is fairly short.

In an embodiment, the payment time interval can also be controlled by the customer. In the illustrated example, the customer can also use a payment interval button 107 to select the payment interval. Although the payments are shown as being monthly, in other embodiments the system can provide any other payment time intervals such as: weekly, bi-monthly, every 2 months, each year, etc. In an embodiment, the default payment interval can be monthly, as shown. Since the customer has selected months, the graphical user interface 100 displays the text "3 payments of $50 / month."

In other embodiments, interest can be integrated into the inventive system. The interest charged can be part of the system's payment calculation, and the interest rate can be displayed on the graphical user interface 100 to inform the customer. The interest being charged can be proportional to the amount of the loan and the duration of the payments. For example, a lower interest rate can be charged for small amount of credit and/or a shorter payment period and a higher interest rate can be charged for a larger amount of credit and/or a longer payment period.

The system may automatically calculate and display the interest rates charged based upon a financial algorithm. The system may charge a first interest rate for a first payment time period, a second interest rate for a second payment time period, etc. For example, in a simple example, the interest can equal the payment time in years selected by the customer. Thus, the system interest algorithm may charge 1% interest for payments completed in 1 year or 12 months, 1.5% interest for payments completed in 1.5 years or 18 months, 2% for payments completed in 2 years, 2.25% for payments completed within 2.25 years or 27 months, etc. In other embodiments, any other interest calculation can be applied. Thus, when the customer slides the payment slider buttons 103, 105, 107, the graphical user interface can display the total credit, the number of payments, the amount of each payment and the interest being charged. Once the credit and terms are set to the desired settings, the customer can click the continue button 221 to proceed with the credit acceptance. Although the user interface has been described as having sliding buttons that can control the terms of the credit payment, in other embodiments any other input can be used including numeric input cells, pull down menus, scroll wheels, etc. In addition to the described user interface controls, the user interface 100 can also include an "Increase Down Payment" button 223 and a "Provide More Information" button 225 which will be described in more detail later.

Figure 4:
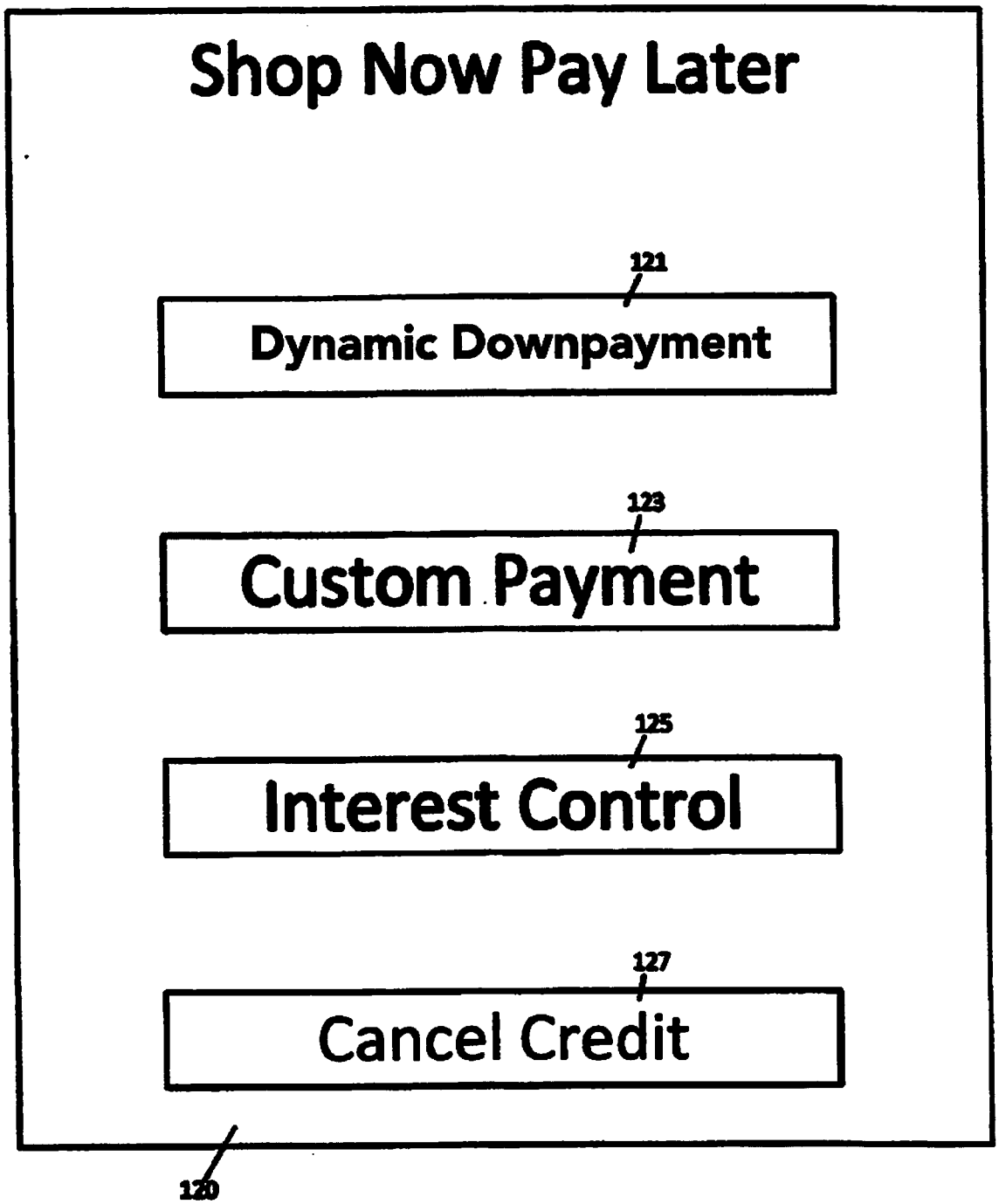
FIG. 4 illustrates an embodiment of a user interface with additional system features including: dynamic down payment, custom payment, interest control and cancel credit.

The user interface 100 may also allow a customer to select other options. The options button 111 can allow additional option controls to be displayed. With reference to FIG. 4, an options user interface 120 is displayed with additional system features including: dynamic down payment 121, custom payment 123, interest control 125 and cancel credit 127. The customer can then select the dynamic down payment 121, custom payments 123 or interest control 125 buttons which can result in an additional user interface being displayed, or select the cancel credit 127 button which may result in a cancel confirmation page before allowing the customer to cancel the credit offer.

Figure 5:
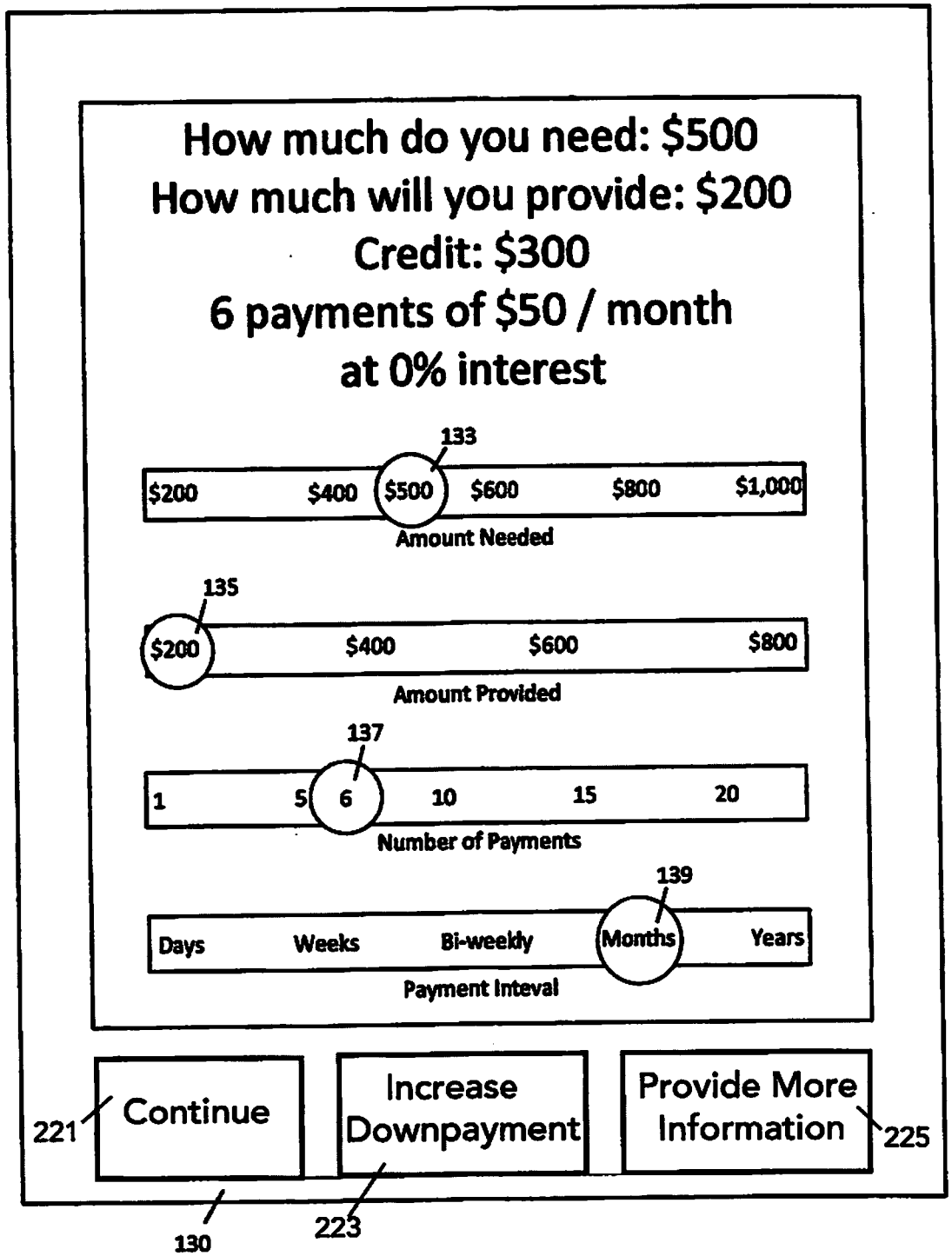
FIG. 5 illustrates an embodiment of a user interface having dynamic down payment controls.

With reference to FIG. 5, if the dynamic down payment option is selected, a dynamic down payment user interface 130 will be displayed. In some situations, the credit being offered to the customer may be insufficient to purchase a desired item. The basic principle of the dynamic down payment feature is to allow a customer to purchase goods or services that exceed the maximum credit being offered by providing funds to make up the difference. The system can allow a customer to divide the payment with the offered credit and the balance of the purchase being paid through any other means. The combination of the credit and the other funds provides the necessary cumulative funds to complete the desired purchase. This can be particularly useful when a customer does not qualify for enough credit to purchase a desired item. This interface is optional, as a credit provider or a merchant may restrict options available to a customer, or the customer may restrict the options available via their account preferences.

In the illustrated example, a customer wants buy a $500 item but the maximum credit offered is only $300. The customer can provide the balance of the $200 at the time of purchase through other means, such as credit cards, cash, check, etc. The user can control the amount needed slider button 133 to select the amount of money needed for the purchase. The system may know that the maximum credit being offered is $300, so the amount being provided can only range from $200 to $500, which is the amount needed minus the maximum credit being offered. These and intermediate values can be displayed on the amount provided slider button 135. The customer can then control the amount provided slider button 135 to the amount of money that can be provided through other means. In this example, the customer has selected $200 as the amount being provided. The system can then display the accepted credit of $300 and the user can select the desired payment terms with the number of payments button 137 and the payment intervals with the payment interval button 139. In the illustrated example, the user has chosen 6 payments at monthly intervals. The system can determine that the payments will be $50/month at a 0% interest rate and display this information.

If the maximum determined credit is less than the amount requested, the customer can request to do a dynamic down payment where the customer takes some or all of the credit approved for their account and provides a down payment for the rest of the transaction. This dynamic down payment can resemble a down payment on a larger purchase, and could be presented as that kind of transaction to a customer. However on the backend the dynamic down payment option is a combination of a payment using a different instrument and the use of a credit provider's credit to the customer's account to pay the merchant for the items in full.

The dynamic down payment option can solve a purchasing problem that can occur with credit cards. For example, if a customer has $300 in cash and a credit card limit of $300 it can be difficult to purchase a $500 item. When the customer tries to buy the item with the credit card, the credit card transaction will be declined and the customer does not have enough cash to complete the purchase. Thus, the customer cannot complete the purchase. The inventive system can prevent this problem by allowing purchases to be made with a combination of offered credit and other funds or credit cards.

Figure 6:
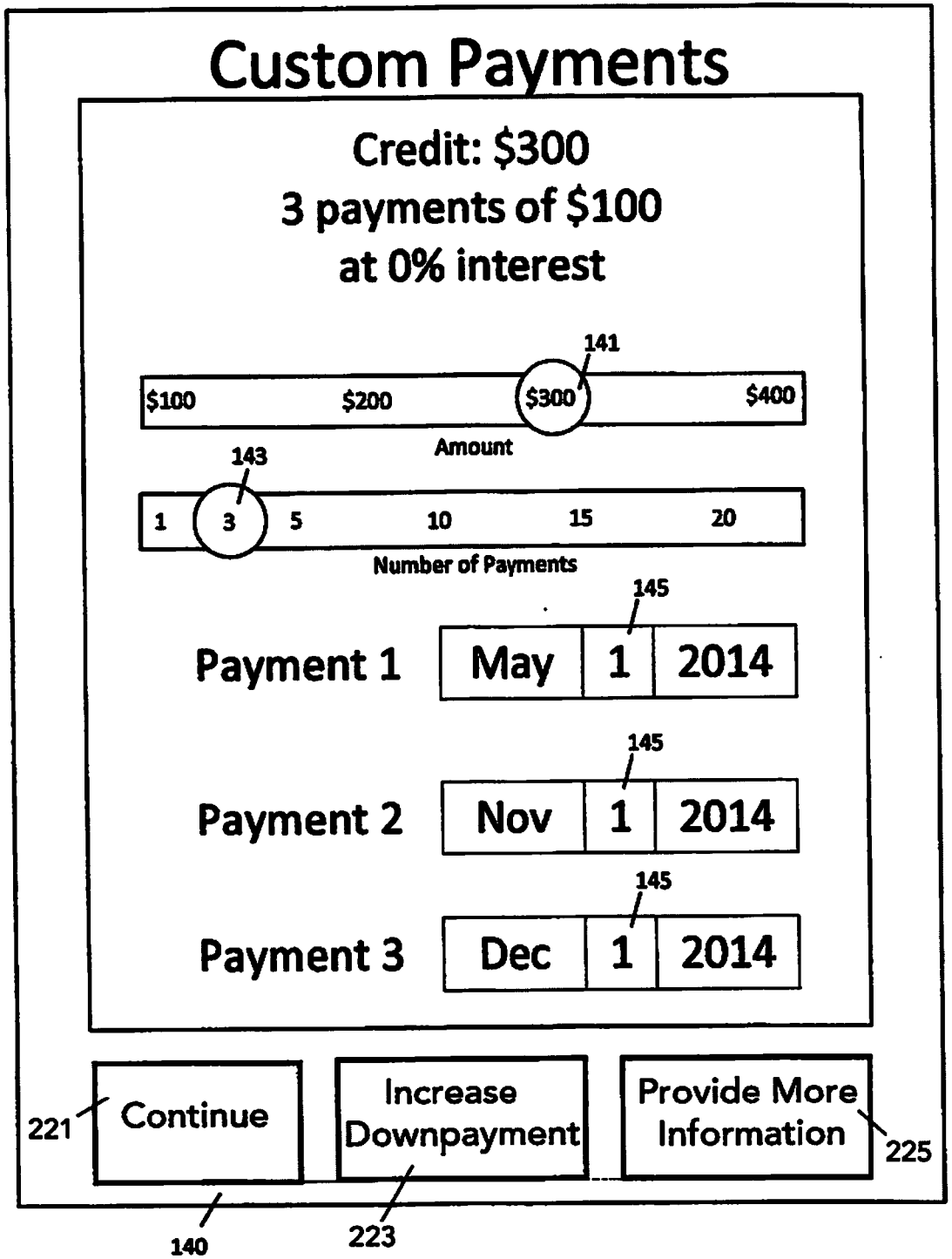
FIG. 6 illustrates an embodiment of a user interface having customizable payment controls.

In an embodiment, the customer can select the custom payment option 123 from the options user interface 120 illustrated in FIG. 4. The system can respond by displaying a custom payment user interface 140 as shown in FIG. 6. In this example, the user may be offered up to $400 in credit and the customer has selected $300 with the amount slider button 141. The user can then select a number of payments with the number of payments slider button 143. In this example, the user has selected 3 payments. The system can then display date inputs 145 for the dates of the 3 payments. The date inputs 145 can be pull down menus, scroll wheels, or any other suitable date input mechanism. In this example, the user has selected a first payment of $100 on May 1, 2014, a second payment of $100 on Nov. 1, 2014 and a third payment of $100 on Dec. 1, 2014. The customer can click on the continue button 142 to complete this transaction or the options button 144 to return to the options page.

Figure 7:
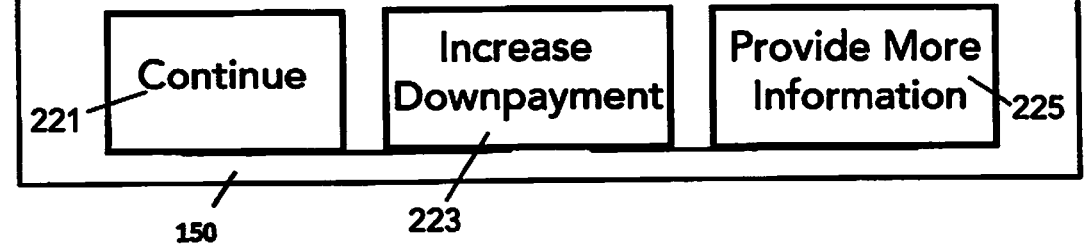
FIG. 7 illustrates an embodiment of a user interface having interest payment controls.

In some embodiments, a customer may be offered more credit or longer payment terms if interest is paid on the credit. It may be useful to the customer to know how much credit and the duration of payments that are possible with the increased interest. If the customer selects the interest control 125 button on the options user interface 120 shown in FIG. 4, the system displays an interest control user interface 150 shown in FIG. 7. A customer can move the interest slider button 155 to the desired interest rate. In this example, the customer has selected 5% interest. The system can respond by displaying the possible payment duration from 1 to 5 years on the number of years button 156 and a credit value of $200 to $1,000 on the amount button 151. In this example, the customer has selected a $600 credit with the amount button 151 and 5 years of payments with the years of payment button 156. The customer can then select the number of payments with the number of payments button 153 and the payment interval with the payment interval button 159. In this example, the system displays the payment terms as 5 payments of $138.58 based upon a 5 year 5% interest. The system may also display the total interest payments, which are $92.90 in this example. By utilizing the interest control tool, a customer can select a personalized purchasing option knowing the different interest options.

In an embodiment, if the customer selects a lower amount and payment duration, the system may automatically reduce the interest to match the proper interest rates for the transaction. For example, if the user selects an interest rate of 5% and then inputs an amount of $200 and payment of 1 year, the system may reduce the interest rate to a lower rate, such as 1%, that corresponds to the credit and payment duration. Once the user has configured the payments to the desired interest and payment schedule, the customer can click the continue button 152 to proceed with the purchase. Alternatively, the customer can press the options button 154 to return to the options page.

The credit tools can be implemented or initiated in various different ways. For example:

1) A customer can visit a merchant or services website possibly from a referral or advertisement offering credit to the user.
2) Customers can request credit. An individual customer and/or all customers that meet a threshold credit rating could be pre-approved for a specific/flat amount of credit. This pre-approval can be based upon a minimum transaction size, average transaction size, average transaction size for time of day.
3) Alternatively, the merchant can request credit for the customers. Merchant credit requests for customers can happen when the customers are mid-way through a shopping session on a website, and trying to decide how much they can buy. The customer may have pre-approval for purchases currently in cart. However, the merchant may wish to provide the customers with pre-approval for purchases in cart, plus an amount of an attempted upsell.
4) This can also happen during the payment process after the user has chosen their items and then chooses Affirm as their method of payment at checkout.

Figure 8:
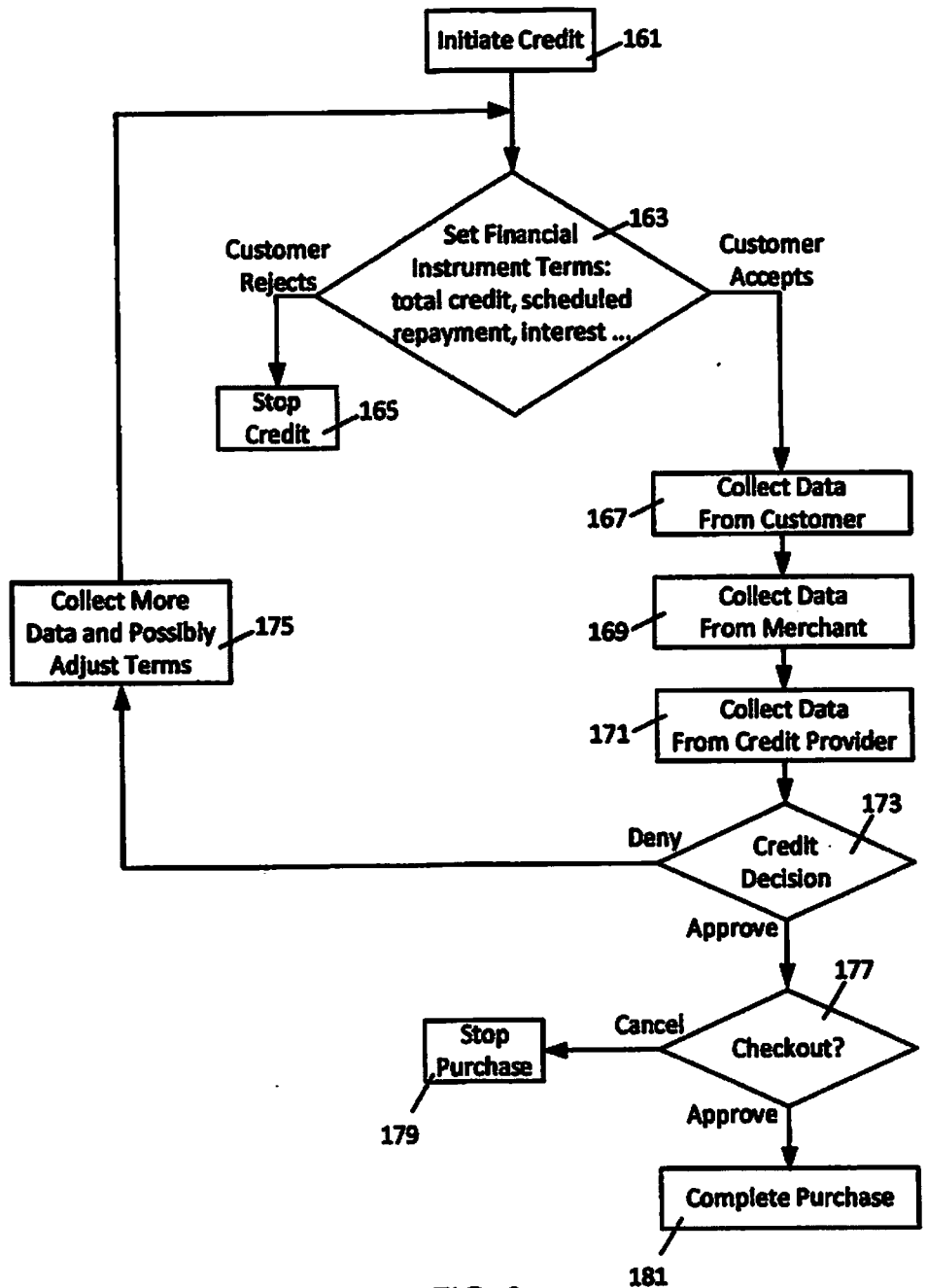
FIG. 8 illustrates an embodiment of a flowchart for using the system for providing additional merchant offers to a credit funded purchaser.

The described credit tools can be utilized in various different possible ways during the purchasing process. Examples of different embodiments of the credit tool implementation are described. With reference to FIG. 8, a flow chart of a possible sequence for customer purchasing is illustrated. The system can initiate credit 161 and the system can set the financial instrument terms that can include total credit, scheduled repayment, interest, etc. 163. Examples of the setting of the financial instrument were illustrated and described above with reference to FIGS. 3-7. If the customer rejects the financial instrument terms, the system can stop the credit process 165. If the customer accepts the terms, the system can collect information from the customer 167. The system may ask the customer for information including: name, phone number for mobile phone, email address, birthday and a portion of the social security number. The system may also collect information from the merchant 169. The merchant information can include a description or identification of the goods and/or services being purchased and identification information for the merchant. The system can also collect information from the credit provider 171.

Figure 9:
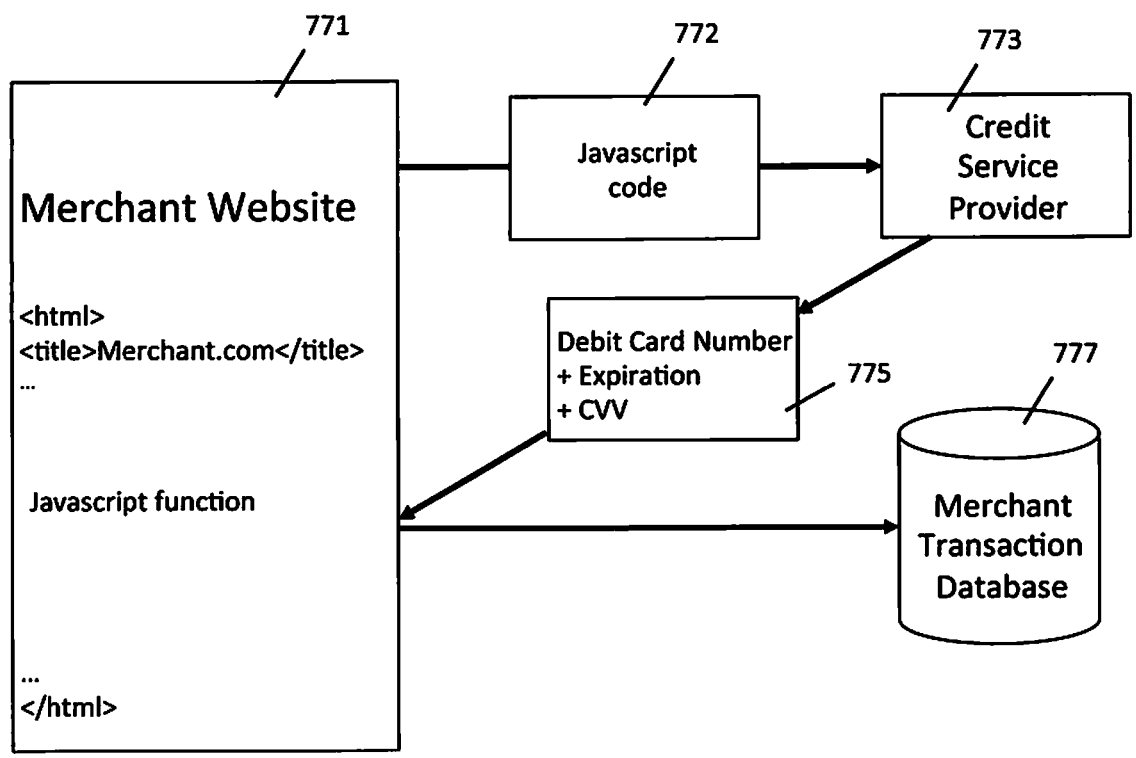
FIG. 9 illustrates a bock diagram an embodiment of interactions between a merchant and a credit service provider during a checkout process.

In an embodiment, as shown in FIG. 9, a merchant 771 can use a line of javascript code 772 to call a script hosted by a credit service provider 773 to execute a checkout system. An embodiment of javascript code 772 to call a script hosted by the credit service provider 773 is below.

The Javascript code described above can create a credit checkout for a merchant 771 that collects user information, transaction information, and/or merchant information. The credit service provider 773 can process the customer information (and/or the transaction information and/or merchant information) and if the customer is approved for credit or pays for the transaction, the credit service provider 773 can issue a prepaid debit card number 775 that can be generated by the credit service provider 773 for the exact amount of the transaction and the debit card number 775 can be accepted by the backend payment software of the merchant 771 without any modification (e.g. if a merchant backend payment system can accept debit or credit cards, the debit card number 775 generated by the credit service provider 773 can be used with no change to the existing backend payment processing system) and fully clears payment for the transaction. The issued prepaid debit card number 775 can be used either one time for a single transaction or for multiple transactions with the same merchant/vendor 771, and can include an expiry period of minutes, hours, days, weeks, months or years, functioning similarly to a "card on file" yet without the need for a physical card to be associated with the customer.

Once the system has the customer, merchant and credit provider information, the system can make a credit decision 173 for the set financial instrument terms 163. The credit decision can be based upon the customer information which can include: a mobile telephone number associated with a client and a legal name of the client from the client computer. Using this information, the system processor can obtain client credit risk information. A low credit risk client will be more likely to receive a credit decision to offer credit while a high client will be less likely to receive a credit decision to offer credit. If the credit decision is approved, the system can let the customer proceed to a check out screen 177. If the customer approves the check out, the purchase is complete 181 and if the check out is cancelled, the purchase is stopped 179.

If the system denies the credit, the system can collect more data from the customer and possibly adjust the financial instrument terms 175. The additional information can include additional identification information, credit card information or other information that may alter the credit decision 173. The adjustment of financial terms can include changing of the total credit, payment duration, interest rate, or other terms that can alter the credit decision 173. Once the

```
CODE:
<script>
var _affirm_config = {
        public_api_key: "XXXXXXXXXXXXXXX",
        script: "https://cdn1-sandbox.affirm.com/js/v2/affirm.js"
};
(function(l,g,m,e,a,f,b){var
d,c=l[m]||{},h=document.createElement(f),n=document.getElementsByTagName(f)[0],
k=function(a,b,c){return function(){a[b]·...·push([c,arguments])}};
c[e]-k(c,e,"set");
d=c[e];c[a]={};c[a]._[];d._=;c[a][b]=k(c,a,b);a=0;
for(b="set add save post open empty reset on off trigger ready setProduct".split("");
a<b.length;a++)d[b[a]]=k(c,e,b[a]);
a=0;
for(b=["get","token","url","items"];a<b.length;a++)d[b[a]]=function(){};
h.async=!0;h.src=g[f];
n.parentNode.insertBefore(h,n);
delete g[f];
d(g);
l[m]=c})(window,_affirm_config,"affirm","checkout","ai","script","ready");
</script>
``` added information is gathered and the terms adjusted, the system can again display the financial instrument terms 163 and repeat the described process. After more information and/or terms are adjusted, the credit decision 173 may be more likely to be approved and the purchase is completed 181.

Figure 10:
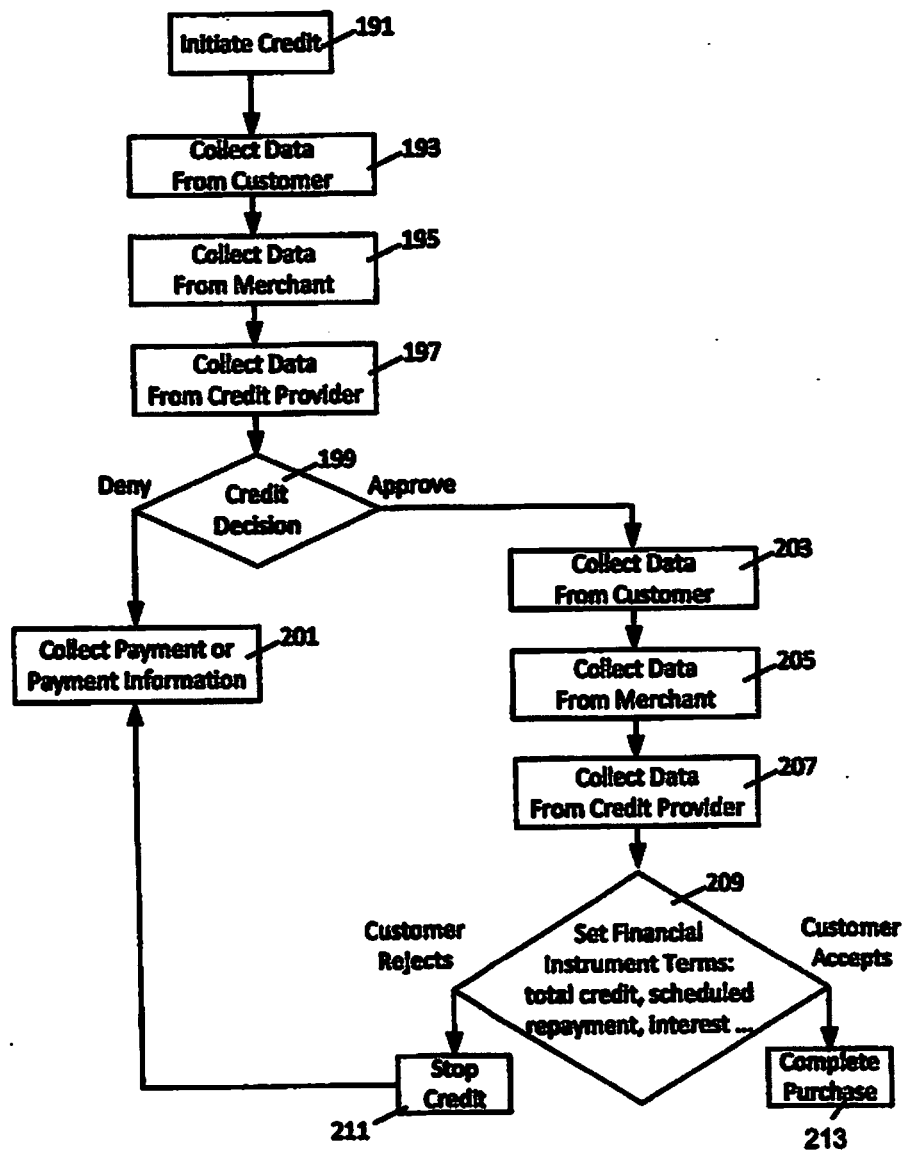
FIG. 10 illustrates an embodiment of a user interface for using the system for Inputting user information.

In the described embodiment, the financial terms are set at the beginning of the purchasing transaction. However, in other embodiments, the described process for setting the financial terms can occur at any other point during the purchasing transaction. With reference to FIG. 10, a flow chart of an alternative embodiment of the described credit process is illustrated. In this embodiment the credit can be initiated 191 and the system can collect data from the customer 193, the merchant 195, and the credit provider 197 as described above with reference to FIG. 6. The system can then make a credit decision 199. If the credit is denied, the system can inform the customer that the credit has been denied and the system can collect alternative payment or payment information which can include credit card, bank account or other payment information.

If the credit decision is approved, the system can make adjustments to the financial terms based upon data collected from customers 203 such as number of payments and interval between payments, data collected from merchants 205 such as credit being offered, and data collected from credit providers 207 such as interest rates. The financial instrument terms can be set and displayed for customer approval 209. If the terms are accepted by the customer, the purchase can be completed 213 and if the terms are rejected by the customer, the credit offer can be stopped 211 and the system can collect payment or obtain payment information 201. With reference to FIG. 9, the process of completing the purchase can include the substep of issuing a prepaid debit card number 775 that can be generated by the credit service provider 773 for the exact amount of the transaction, such that the debit card number 775 can be accepted by the backend payment software of the merchant 771 without any modification (e.g. if a merchant backend payment system can accept debit or credit cards, the debit card number 775 generated by the credit service provider 773 can be used with no change to the existing backend payment processing system) and fully clears payment for the transaction.

If the determined credit is greater than the amount of credit requested by the customer, the customer is granted at least the amount of credit he or she requested. The system can then offer more credit than the customer asked for or the customer can be offered an upsell to a larger credit limit, with a higher (or lower) interest rate. These additional offers can be used as an encouragement to spend more or be provided with upsells in an online or physical retail store.

Figure 11:
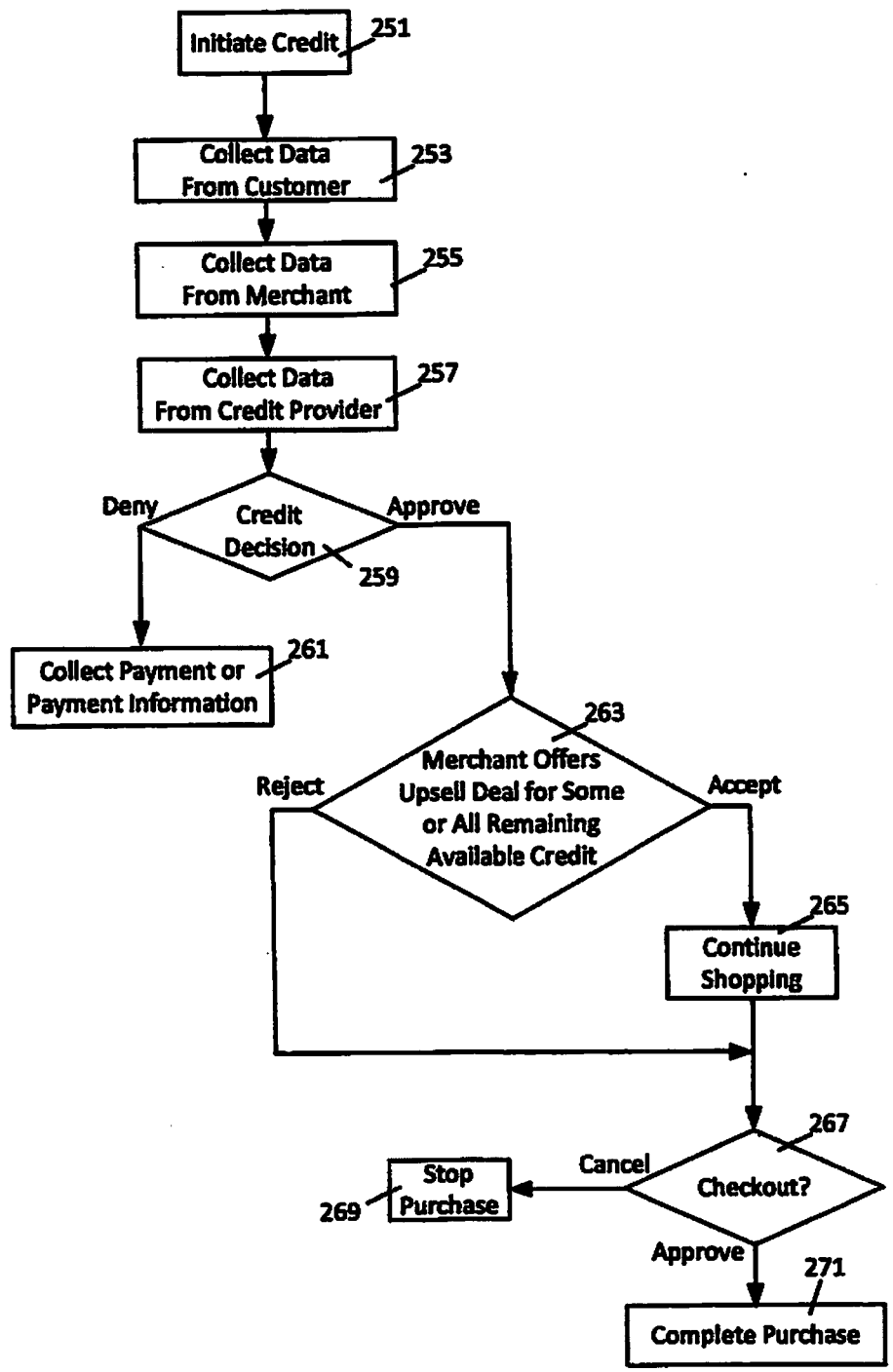
FIG. 11 illustrates an embodiment of a user interface indicating credit approval and credit terms.

An embodiment of an additional purchase offer flow chart is illustrated in FIG. 11. In some embodiments, the system can detect that the offered credit is not being accepted. Based upon the quantity of the amount of the unused credit, the system can issue an additional offer based upon some or all of the remaining credit. In the example, the system can initiate credit 251 and collect data from the customer 253, the merchant 255, and the credit provider 257. The system can then make a credit decision 259. If the credit is denied, the system can collect payment or payment information 261 from the customer. If the credit is approved and the system detects that all of the available credit being offered was not accepted, the system can allow the merchant to offer the customer an upsell deal for some or all of the remaining available credit 263. If the customer accepts the additional offer, the customer can continue shopping 265 and proceed with the purchase of additional goods and/or services to the check out 267. If the customer rejects the additional merchant offer, the system can proceed directly to the check out 267. At the check out screen 267, the customer can cancel the purchase, which will stop the purchase 269, or approve the checkout and complete the purchase 271. The process of completing the purchase 271 can include the substep of issuing a prepaid debit card number that can be generated by the credit service provider for the exact amount of the transaction, such that the debit card number can be accepted by the backend payment software of the merchant without any modification (e.g. if a merchant backend payment system can accept debit or credit cards, the debit card number generated by the credit service provider can be used with no change to the existing backend payment processing system.) and fully clears payment for the transaction.

In other embodiments, the credit process can include a dynamic down payment process can include additional features that provide more flexibility when making purchases. For example, with reference to FIG. 12, a flowchart is illustrated that describes a process for altering the payment terms based upon the user providing an additional down payment. The customer visits a merchant site and/or merchant application and places one or more items in the shopping cart. Once the desired items are placed in the cart, the user can proceed to check out 351. The system can approve the customer for some credit but the amount of credit approval can be insufficient to pay for the items in the cart. The user interface can respond by displaying down payment and interest rate options 353.

With reference to FIG. 13 an embodiment of a user interface 160 is illustrated that includes the loan terms based upon the initial customer credit approval. If the user decides to pay additional funds to the down payment, the system can display a user interface that allows the down payment amount or interest rate loan terms to be adjusted. In this example, the user has input a down payment of $400 (231) and an interest rate of 5% (233). The system can respond to these inputs by offering a credit approval for a $600 (235) loan amount on a $1,000 purchase. The user can also input loan payment terms. In the illustrated example, user has selected a term of 5 years (237) with a total of 5 payments (238) that are paid on yearly intervals (239). If the user accepts these loan terms, the user can click on the "Continue" button 221 and the system will proceed to process the transaction. In an embodiment, the user may want to improve the loan terms and the user can change the down payment and/or interest rate.

Figure 12:
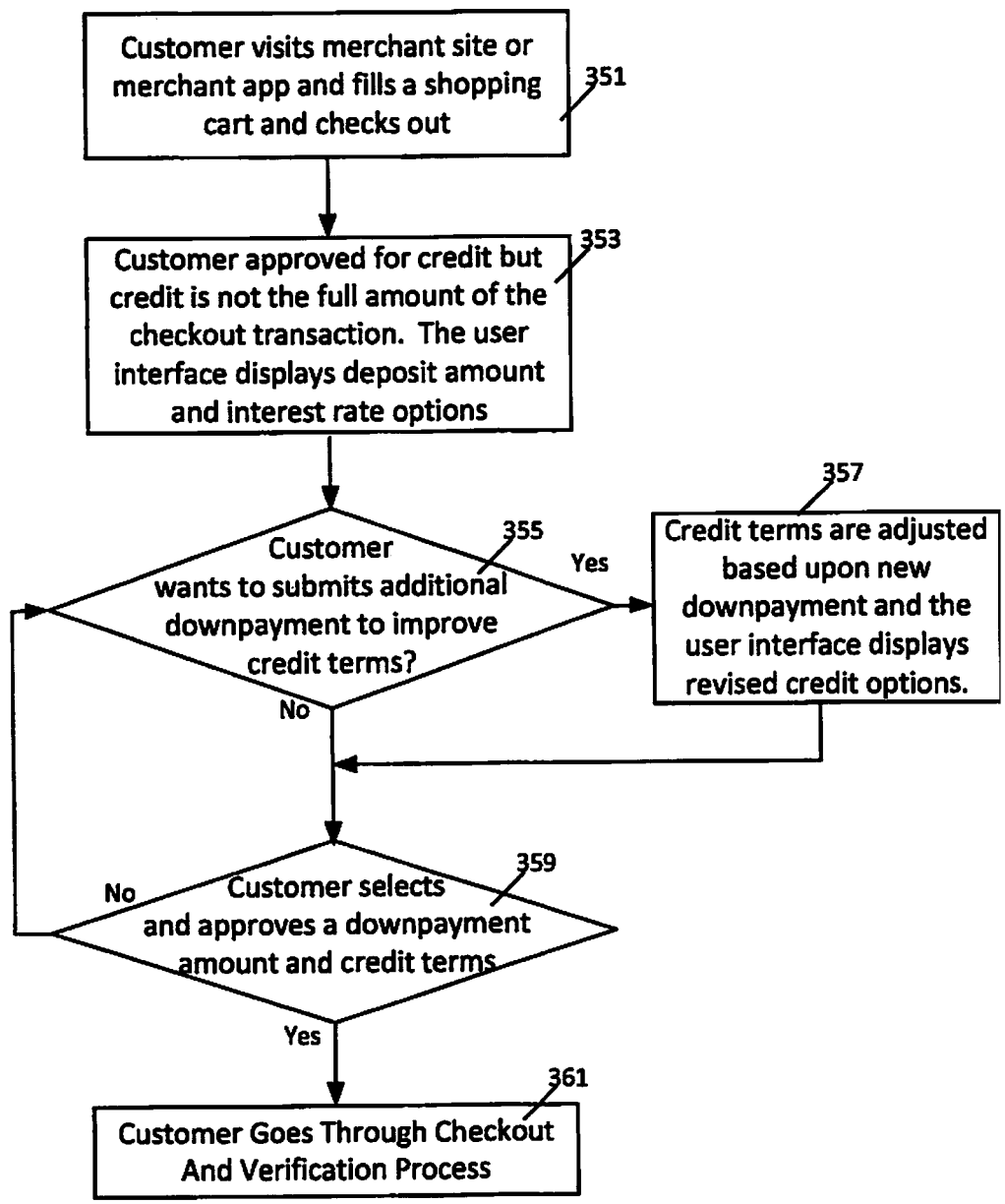
FIG. 12 illustrates an embodiment of a flowchart for altering the payment terms based upon an additional down payment.

The user can click on the "Increase Down payment" button 223 to increase the down payment on the purchase. With reference to FIG. 12, the customer can have the option of submitting an additional down payment which may alter the credit amount and/or credit terms 355. Based upon the additional down payment the system can adjust the credit terms 357. The system can then display the adjusted credit offer based upon the new down payment information. In the illustrated example with reference to FIG. 14, the user has increased the down payment amount from $400 to $600 (162). In response to the increased down payment, the system can display improved credit terms with a new interest rate of 3% (164). The credit amount has been changed to $400 (166). However, the repayment terms have not changed. The repayment is over 5 years (170) in 5 payments (168) with an interval between payments of one per year (169).

With reference to FIG. 12, the user can then choose to select and approve the down payment amount and credit terms 359. If the user selects and approves the down payment and credit terms, the user can proceed to the checkout and verification process 361. If the user does not select and approve the down payment and credit terms, the system can give the customer another opportunity to submit additional down payment funds to improve the loan terms 355.

Figure 15:
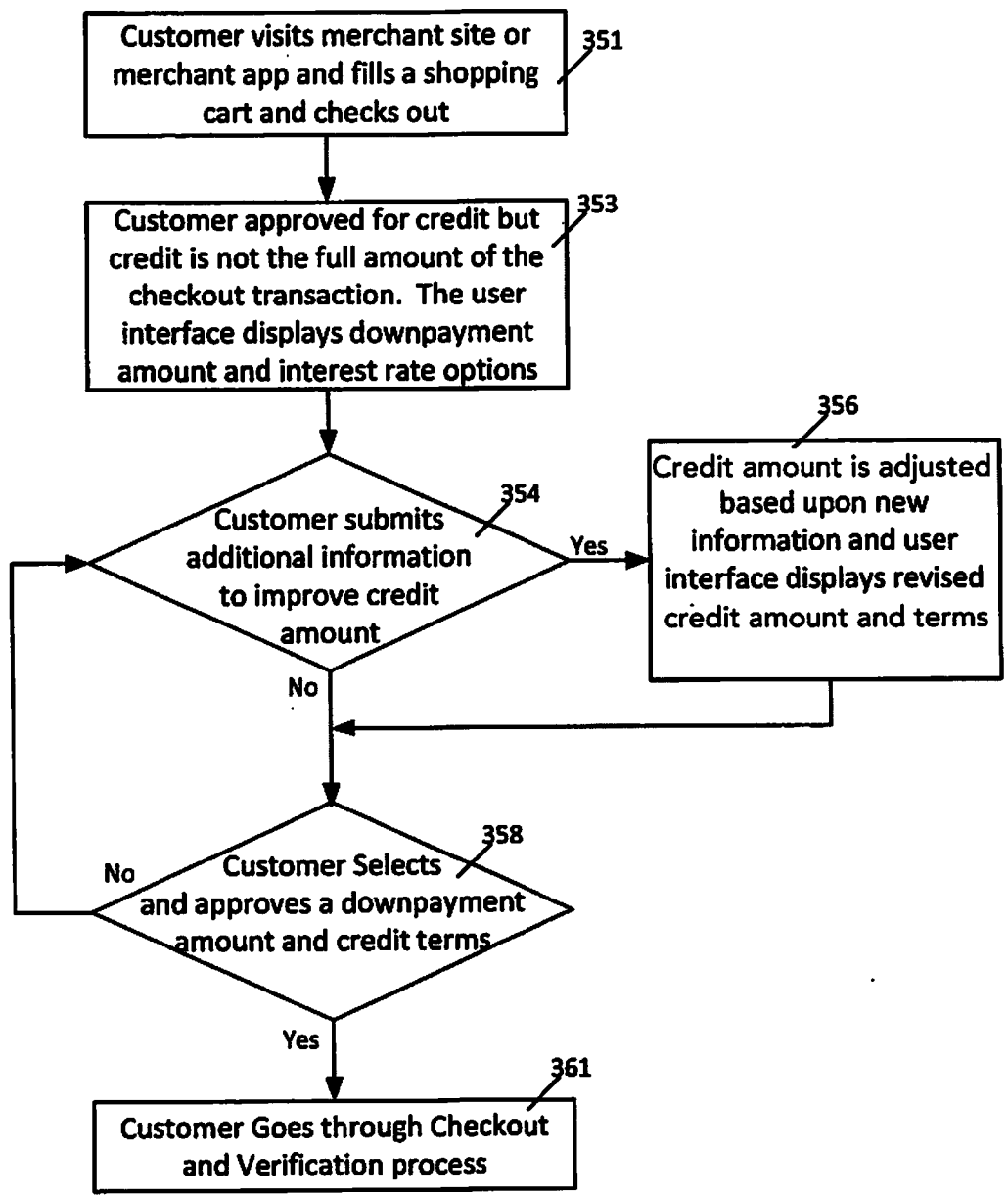
FIG. 15 illustrates an embodiment of a flowchart for altering the payment terms based upon the user providing additional information.

With reference to FIG. 15, a flowchart similar to FIG. 12 is illustrated that describes a process for altering the payment terms based upon the user providing additional information. In an embodiment, the processing described with reference to FIG. 15 can be combined with the processing shown in FIG. 12. However, for simplicity, FIG. 15 shows how the system processes additional information provided by the user to change the loan terms by improve (increase) the credit amount. The customer visits a merchant store and/or uses a merchant application. The desired item(s) are placed in the cart, the user can proceed to check out 351. The system can approve the customer for a loan for a part of the total cost and the user interface can respond by displaying down payment and interest rate options 353. In an example, the system can respond by offering the user the same loan terms shown in FIG. 13.

With reference to FIG. 15, the customer can have the option of submitting additional information which may alter the credit amount and/or credit terms 354. If the user decides to input additional information, the user can click on the "provide more information" button (shown as 225 in FIGS. 13, 14 and 16) the system can respond by displaying a listing of possible personal information input buttons. With the additional information, the system can have the option of submitting additional customer information which may alter the credit amount and/or credit terms 354. If additional information is input, the system can adjust the credit amount based upon the new information and the user interface can display the revised credit amount and credit terms 356. The system can then display the credit offer based upon the new down payment information if the user has submitted new information. The user can then choose to select and approve the down payment amount and credit terms 358. If the user selects and approves the down payment and credit terms, the user can proceed to the checkout and verification process 361. If the user does not select and approve the down payment and credit terms, the system can give the customer another opportunity to submit additional down payment funds or personal information to improve the loan terms.

Figure 16:
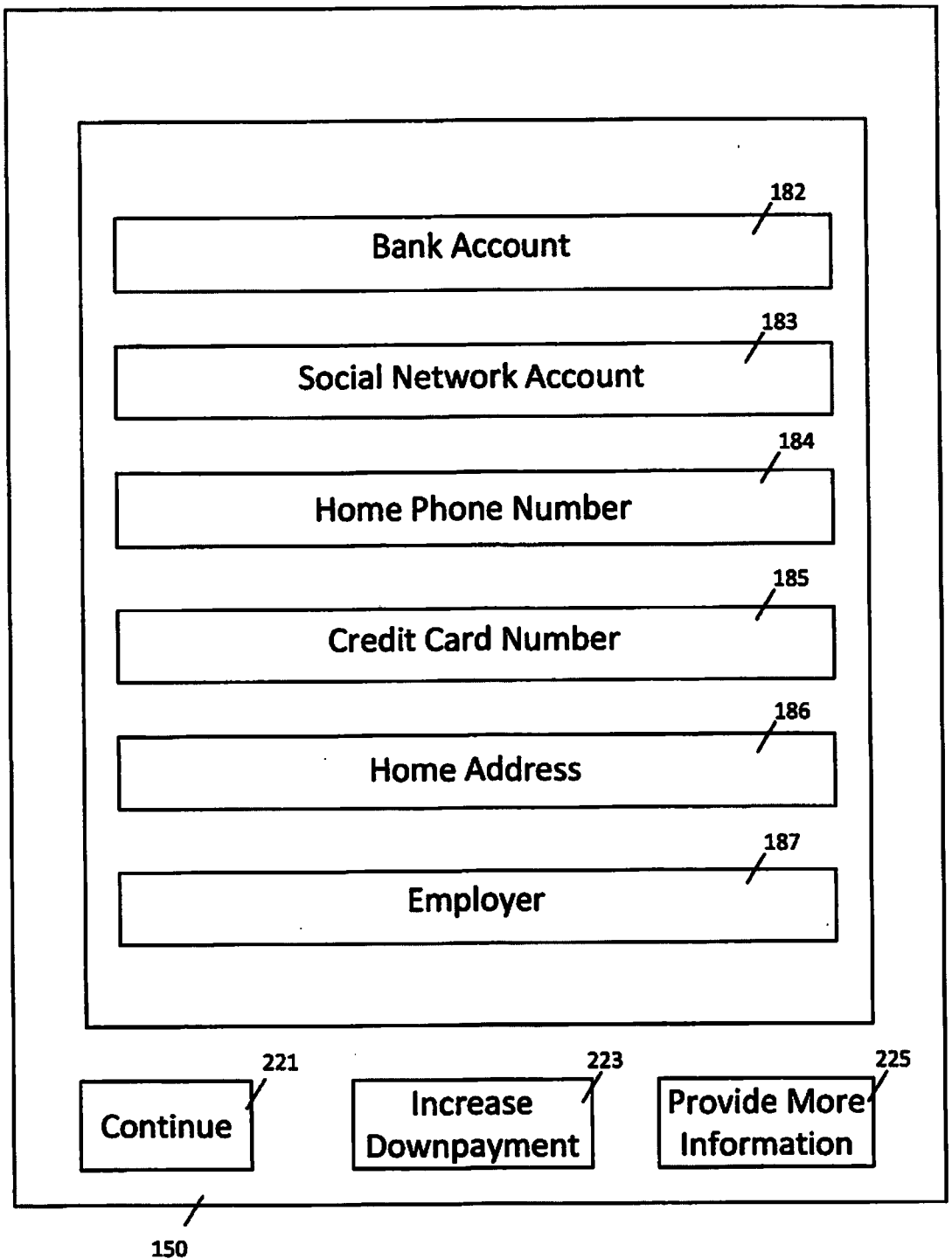
FIG. 16 illustrates an embodiment of a user interface for inputting additional personal information for revised credit and loan terms.

With reference to FIG. 16, the user interface can allow a user to input additional personal information which can result in a revised (improved) credit and loan term offer. Various types of additional information can be used by the system to adjust the loan terms. In an embodiment, the user interface may display buttons that allow different types of information to be input. These buttons can include: Bank Account 182, Social Network Account 183, Home Phone Number 184, Credit Card Number 185, Home Address 186, and Employer 187. When the user clicks on any of the personal information input buttons, the system can respond by displaying inputs for the personal information.

The information for the Bank Account 182, Home Phone Number 184 and Credit Card Number 185 can include an input space for the number. The information inputs displayed when the Social Network Account button 183 is actuated can include: the social network name, user name and password. In response to clicking the Home Address 186 button, the system can display inputs for the home address and in response to clicking the Employer 187 button, the system can display inputs for name and address. With this additional information, the system can identify more of the user's credit information and further validate the identity of the user and the system can improve the terms of the loan offer.

With reference to FIG. 17, the system has processed additional information provided by the user and the system has determined that the additional information improves the credit worthiness of the user. The system user interface now displays improved loan terms. In this example, the down payment remains $400 (231) and the total purchase is still $1,000. However, the interest rate has been changed from 5% to 4% (232) and the credit amount has been changed to $600 (235). The system can also allow the user to select the loan replayment terms. In this example, the user has maintained the 5 year (237) repayment duration but changed the payments to 60 (234) payments made on a monthly basis (236).

The information provided by the user can be processed in various ways. For example, a valid bank account number that was established several years ago would be evidence that the user is a real person and can improve the user's credit risk. In contrast, if a bank account number is invalid or if the account number has been frozen, this can be evidence that the user is not credit worthy and the system can increase the user's credit risk. Similarly, a valid social network account that has existed for a reasonable duration of time with many postings and social connections is evidence that the user is a real person. In contrast, a social network that has just been set up with no posts and no connections can suggest that the user may have created a fictitious account. The system can analyze the user's social network information and make further credit worthiness calculations based upon the user's social network information, such as similarities with other fake or automatically created accounts.

If a user inputs a home phone number, the system can determine if the phone number is active and a possibly the home address. In an embodiment, the system can compare the identity of the homeowner with the system user to determine if the system user is the homeowner. Similarly, if the system inputs the home address, the system may know the location of the home and possibly the purchase price and current estimated value which can be interpreted as an asset of the user. The user information indicating user assets can provide evidence that the user is credit worthy with improved credit terms.

The credit card can provide information about the user including: available credit limit, current balance, balance remaining, and possibly additional creditworthiness information, such as how long a user has held the credit card, how often they pay it off in full, how frequently they are paying, if they are late. Additionally, a known fraudulent credit card number can be used to initiate a "honey-pot" that can be used to detect, deflect and/or counteract attempts at unauthorized use of information. In an embodiment, additional information is solicited from a possible scammer, and additional fraudulent information is collected and added to a blacklist of names, addresses, numbers, etc. via the honey-pot.

If the user inputs the employer information, the system may be able to predict the user's employment, job stability and possibly predict the user's income. For example, if the user inputs an established business such as Bank of America, this can be interpreted as being more job security and possibly higher credit worthiness than a user who is employed by a self funded start up company. In an embodiment, a combination of information can be used to determine more about the user. For example, if the user has a technical background in computer science based upon his education posted on the social network and the user works for a software company, it is probable that the user is a computer programmer. Based upon the profession, employment location and employer, the system may also estimate an income of the user. The system may use the predicted income of a user as evidence of the user's credit worthiness of the user. In an embodiment, it is possible for the credit terms to be made worse based upon the additional information provided by the user. However, if the initial interest rate terms are set high enough by default, then any amount of additional information can normally improve the purchase terms for the user.

Figure 18:
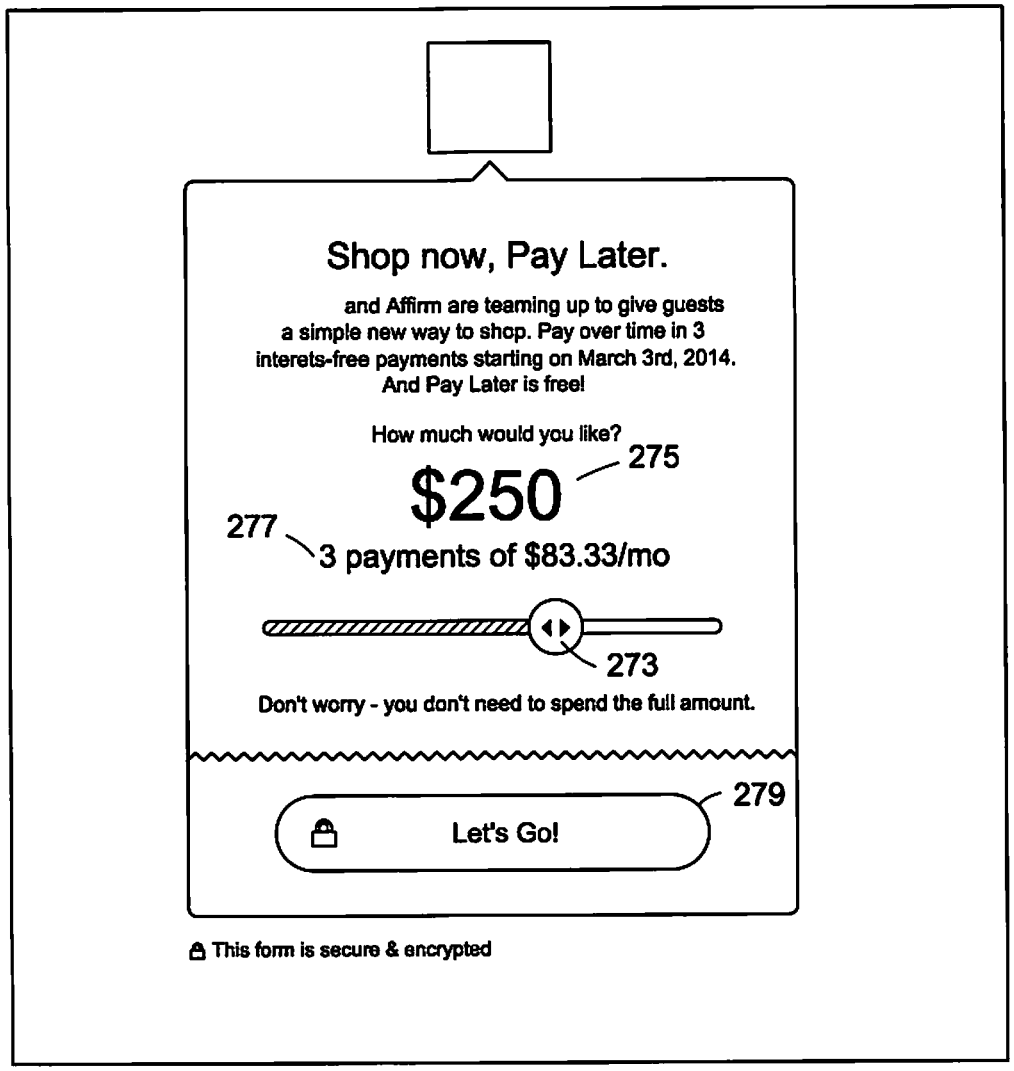
FIG. 18 illustrates an embodiment of a user interface with a loan control.

With reference to FIG. 18 an embodiment of a user interface is illustrated with a single amount slide button 273 that controls the amount of credit that the customer requests. In this example, the customer has selected the amount 275 of $250 and the system has displayed the payment schedule 277 of 3 payments of $83.33/month. If this amount and the payment terms are acceptable to the customer, the "Let's Go!" button 279 can be pressed.

Figure 19:
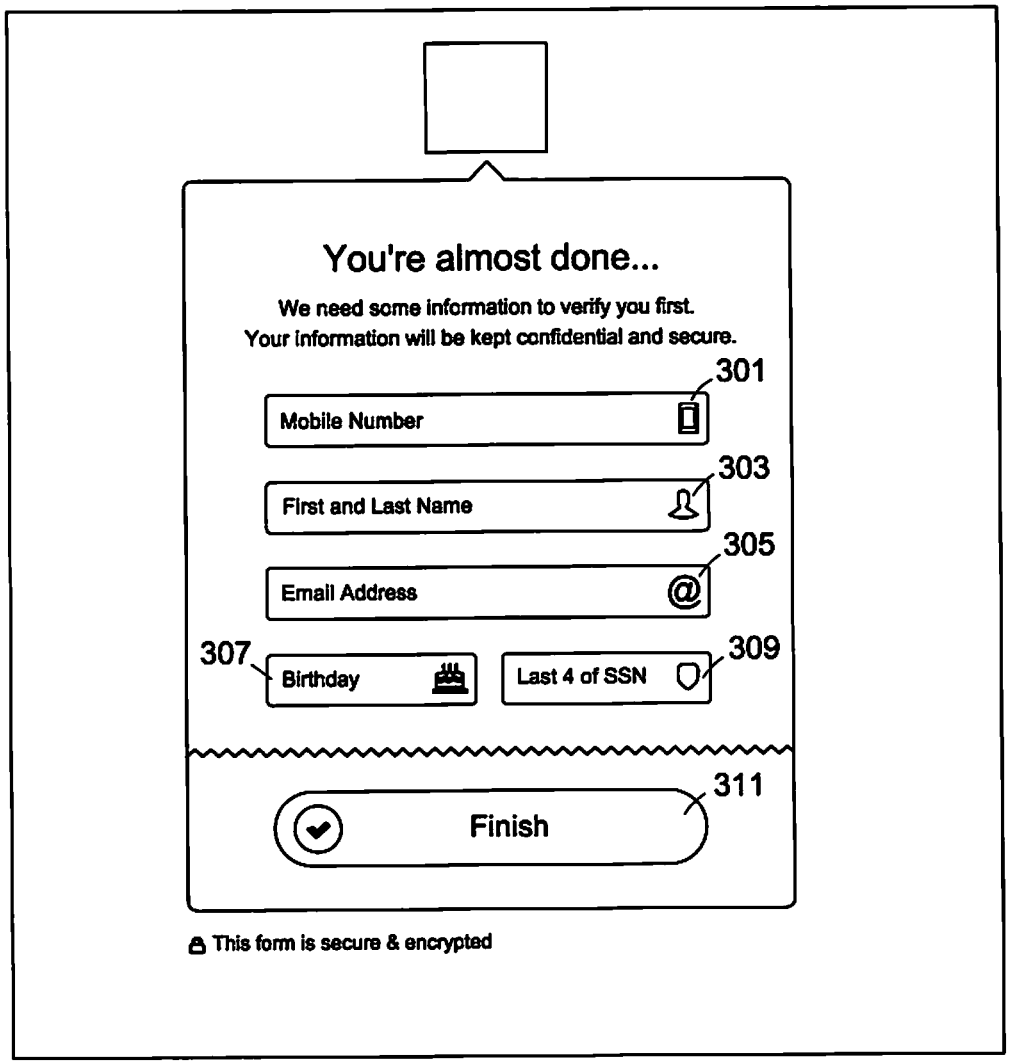
FIG. 19 illustrates an embodiment of a user interface with customer input fields.

With reference to FIG. 19, the system can respond to the acceptance button by displaying an input for customer information. The customer can input mobile phone number in the Mobile Number field 301, the first and last name in the First and Last Name field 303, the email address in the Email Address field 305, the customer's birthday in the Birthday field 307 and some of the digits of the social security number in the Last 4 of SSN filed 309. In other embodiments, more or less information can be requested by the system. Once the customer has inputted the requested information, the customer can press the "Finish" button 311. The system can process the customer information and then issue an acceptance or a rejection of the credit for the customer or possibly a request for additional information from the customer.

Figure 20:
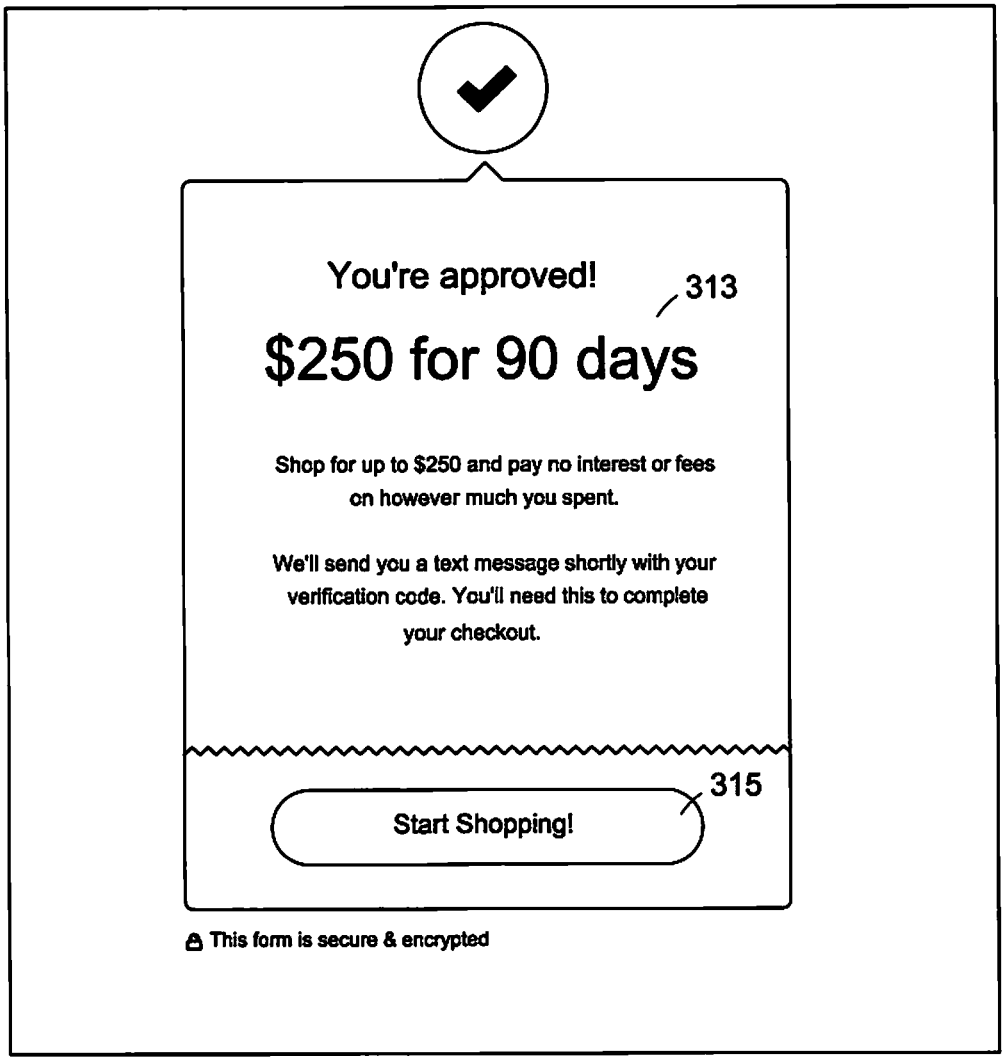
FIG. 20 illustrates an embodiment of a user interface with a credit request slide button.

With reference to FIG. 20, an example of a credit approval message is illustrated with some additional information about the terms of the credit. In this example, the system has issued a credit 313 of $250 for 90 days. The customer is informed that he or she can shop for up to $250 and pay no interest or fees regardless of how much the customer spends. The customer is also informed that a text message that includes a verification code will be sent to the customer's cell phone. The customer can respond to the credit approval by clicking on the "Start Shopping!" button 315.

With reference to FIG. 21, a checkout webpage that includes the credit verification code input field 317 is illustrated. The user has a shopping cart 319 that includes 1 x brow kit, 1 x lip balm and 1 x eyeliner gel. The order summary section 321 shows a subtotal of $68.00, a new customer discount of $10.00 and free shipping. The order total is $58.00. The seller website knows that the customer has received a credit of $250 and the customer can input the verification code that was received by the customer's mobile phone into the credit verification code input field 317. Once the verification code is inputted, the customer can click on the "Verify" button 323. Alternatively, if the customer did not receive the verification code, the customer can click on the "Resend Code" button 325 which can cause the verification code to be resent to the customer's mobile phone.

With reference to FIG. 22, the verification code input from a checkout webpage, such as the one illustrated in FIG. 21, was correct and the system displays a message 327 saying that the customer is using $58 from the credit provider and indicating that the credit balance is $192. The system may also clearly show a "PAY LATER" arrow 329 indicating that $58 will be paid in 90 days and a "DUE NOW" arrow 331 indicating an order total of $0.00.

Figure 23:
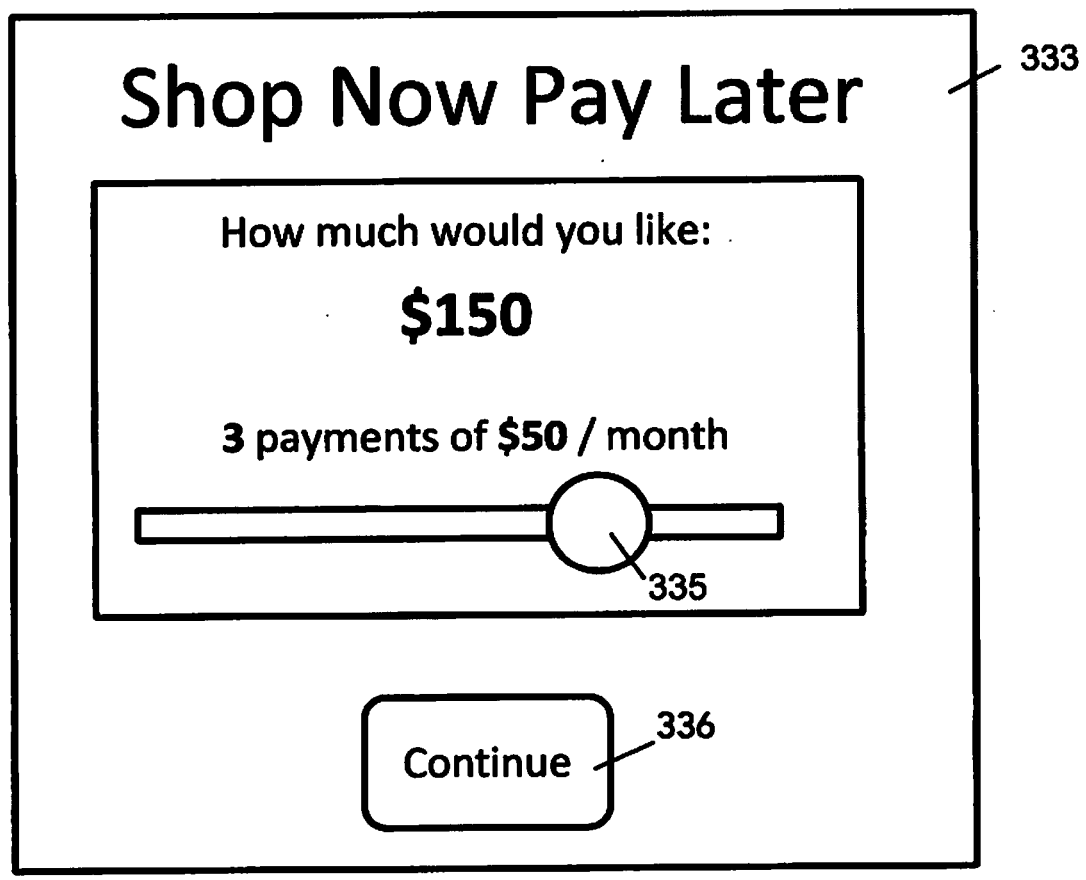
FIG. 23 illustrates an embodiment of a user interface with a credit request slide button.
Figure 24:
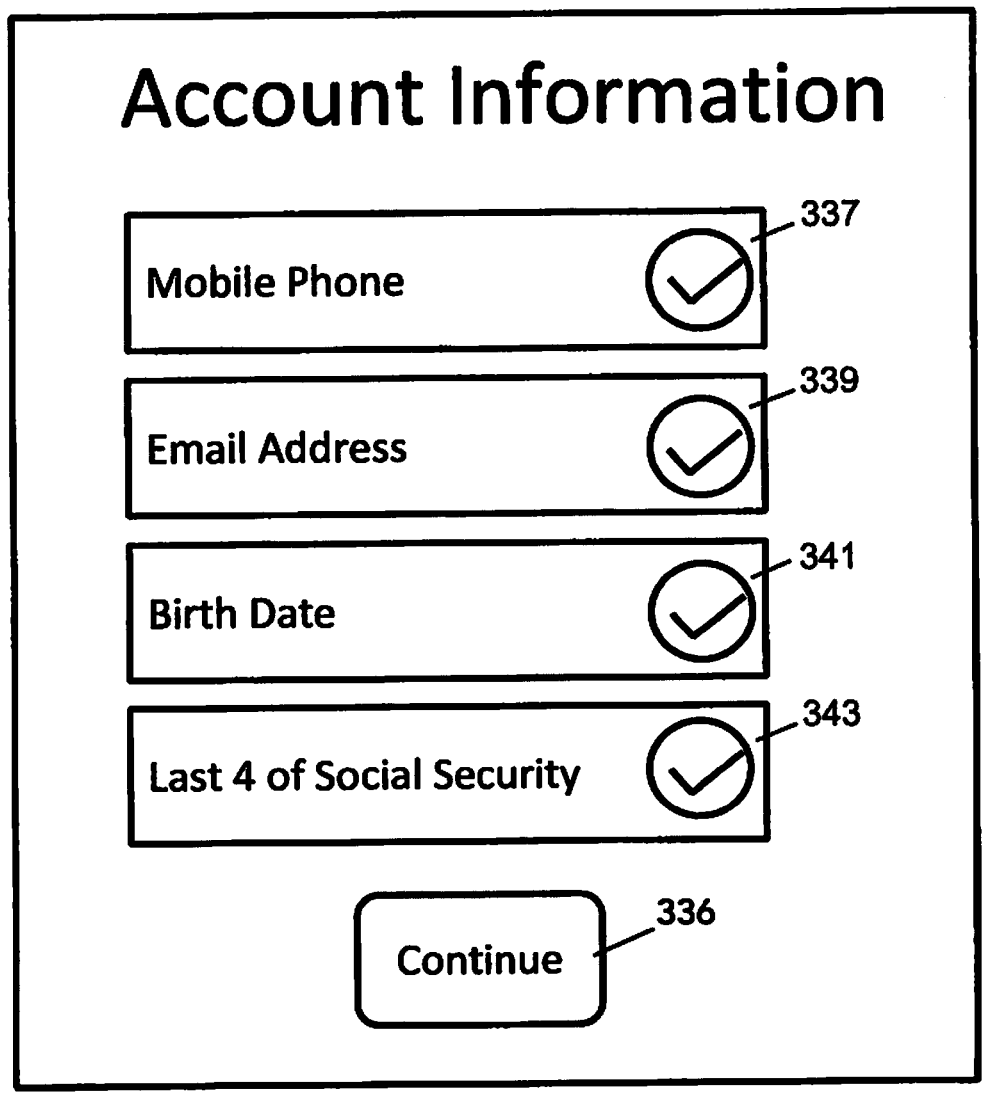
FIG. 24 illustrates an embodiment of a user interface with customer information input fields.
Figure 25:
FIG. 25 illustrates an embodiment of a user interface with a credit approval message.

With reference to FIG. 23, another embodiment of a user interface 333 with a credit request slide button is illustrated. In this embodiment, the user can click on an ad or promotion to initiate a credit input window from the credit provider. In this example, the user has moved the slide button 335 to a credit of $150 and the system displays 3 payments of $50/month. The user can click on the continue button 336 to proceed with accepting this $150 credit. With reference to FIG. 24, after the customer has chosen the loan terms, the system can request customer information that can include one or more of: mobile phone number, email address, birthdate and a portion of the social security number. As illustrated in FIG. 24 these pieces of information have been supplied as indicated by check marks in fields 337, 339, 341 and 343. In other embodiments, less or more customer information can be required by the system. The customer can then click the continue button 336 to proceed with the credit processing. The system can accept or reject the credit offer based upon the customer information. The acceptance or rejection of the credit offer can occur in real time which can be less than a few seconds. With reference to FIG. 25, if the customer information results in a credit approval, the system can display a message 345 indicating that the customer's credit has been approved for $150 with a payment plan of 3 payments of $50 / month.

Figure 26:
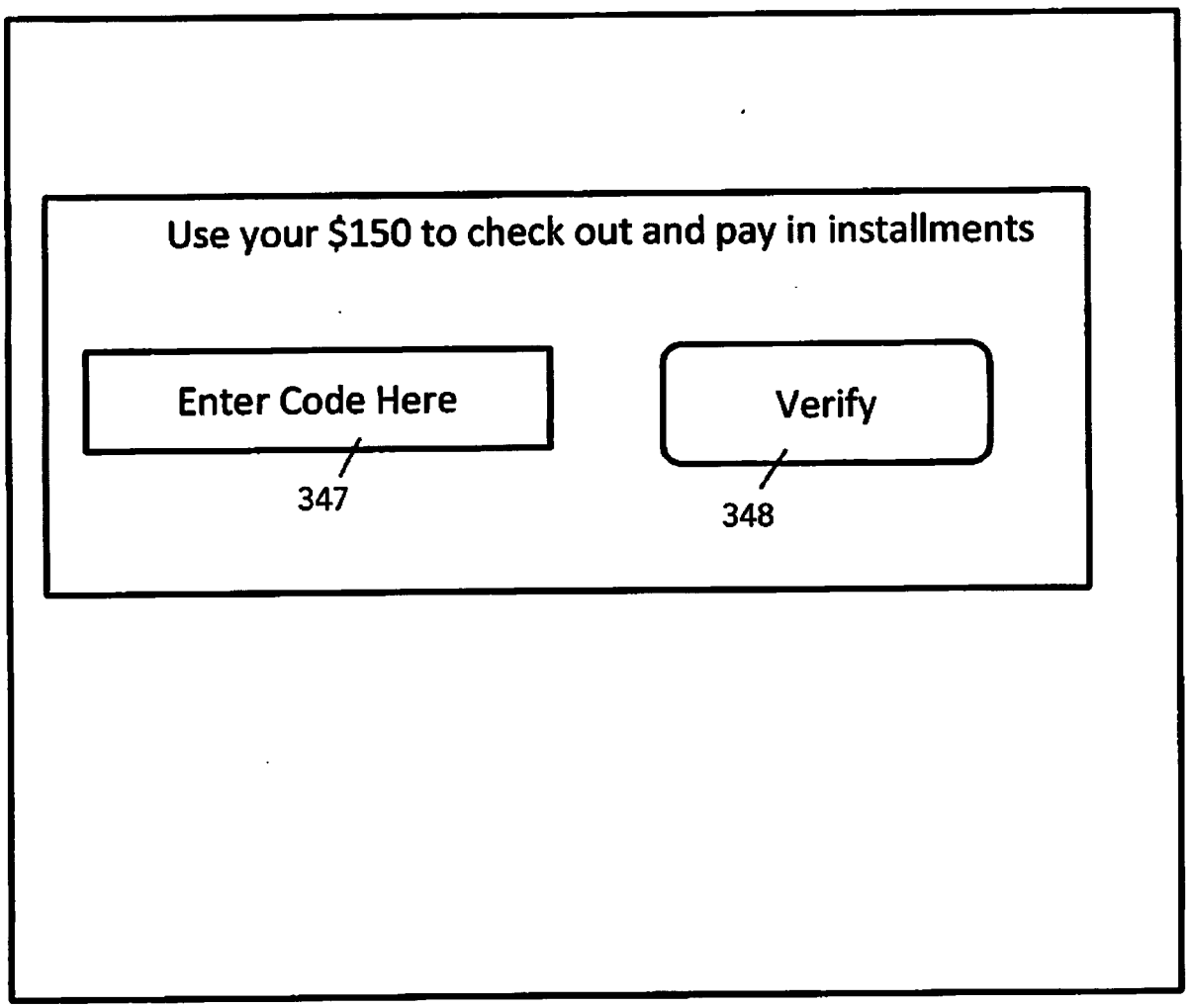
FIG. 26 illustrates an embodiment of a user interface for a purchase check out with a verification code input.
Figure 27:
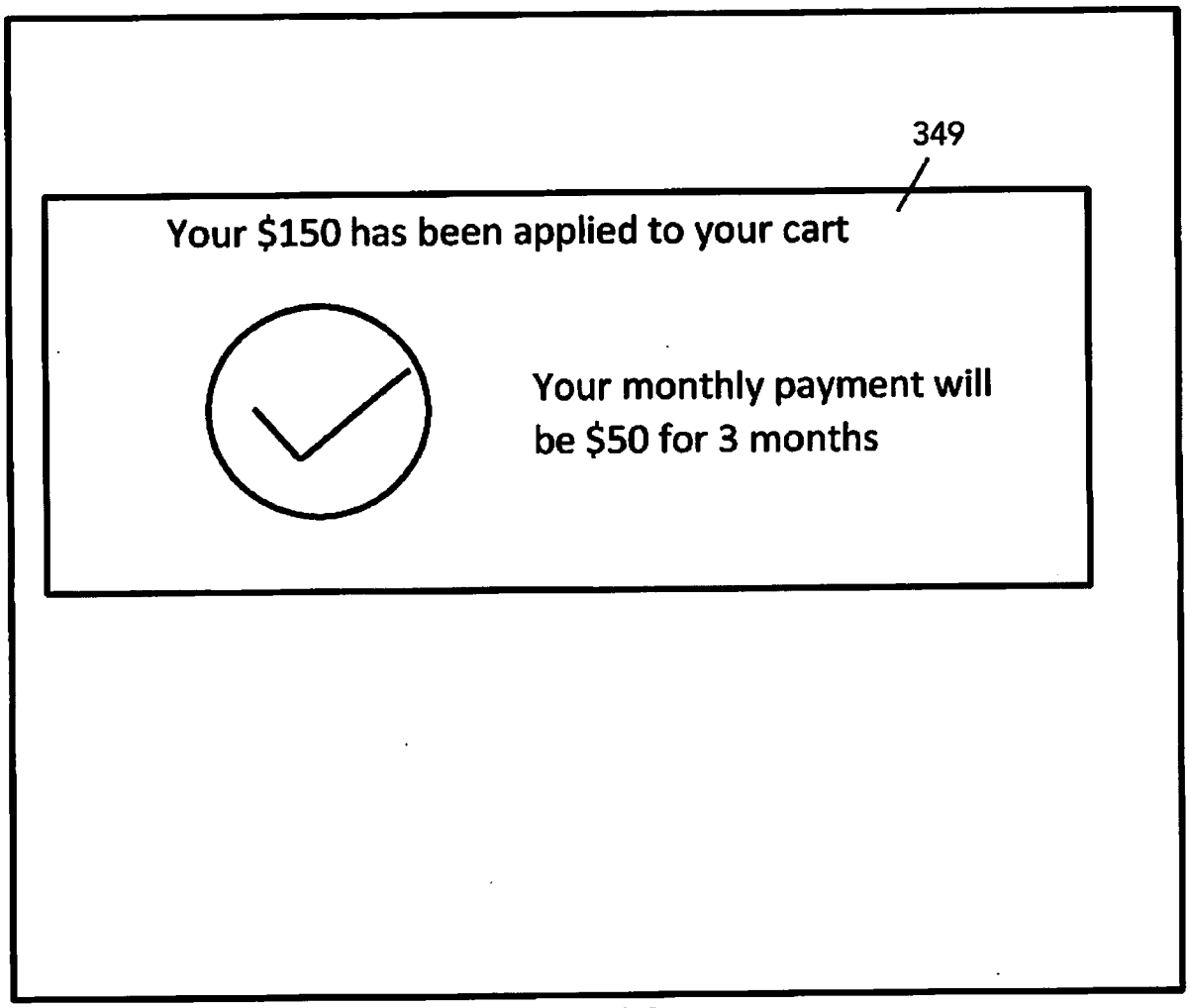
FIG. 27 illustrates an embodiment of a user interface with a credit application and payment message.

The customer can accept the credit offer by clicking on the "Go Shopping" button 338. The system can respond to the customer approval of the credit offer by sending a credit verification code to the customer's mobile phone that is used by the system to verify the credit offer made to the customer. The customer can go shopping through a merchant website and select one or more items to purchase. With reference to FIG. 26, at the check out page of the merchant website, the system can display an input for the verification code 347. In an embodiment, the merchant cart or payment webpage can be embedded with the credit processor request interface as shown. The customer can enter the verification code in the designated input space and click on the verify button 348. With reference to FIG. 27, after the verification code is validated by the system, a message 349 indicating that the credit has been applied to the customer's cart is displayed. In this example, the verification code input by the customer was valid and a $150 loan was applied to the checkout purchase(s). The system can also display the payment terms of $50 for 3 months and the purchase using the credit can be completed. After this message is displayed, the purchase transaction can be completed normally. For example, the transaction can be completed by the merchant sending the customer a receipt by email or text message. If the verification code is incorrect the system can instruct the customer to re-input the verification code. The system server can detect "suspicious activity" if a user improperly inputs the verification code multiple times and the system can cancel the credit offer. Suspicious activity can include numerous incorrect verification code inputs, excessive time between receiving the verification code and inputting the verification code, etc.

Figure 28:
FIG. 28 illustrates an embodiment of a user interface shopping bag.

With reference to FIG. 28, another embodiment of a user interface. In this embodiment, the user would fill their cart on a shopping site and be offered the option to pay with credit while checking out. In this example, the user's shopping cart has $23 item in it. When the user clicks on the button to check out and pay later with credit, the system can request customer information that can include: mobile phone number, email address, birthdate and a portion of the social security number. As illustrated in FIG. 24, these pieces of information have been supplied as indicated by check marks in fields 337-343. In other embodiments, less or more customer information can be required by the system. The customer can then click the continue button 336 to proceed with the credit processing at which point with reference to FIG. 26 the system can display an input for the verification code 339 to verify the user's identity. With reference to FIG. 27, after the verification code is validated by the system, the system can accept or reject the credit offer based upon the customer information. With reference to FIG. 25, if the customer information results in a credit approval, the system can display a message 337 indicating that the customer's credit has been approved for $150 with a payment plan of 3 payments of $50 / month. The customer can accept the credit offer and complete their checkout by clicking on the "Go Shopping" button 338.

Figure 29:
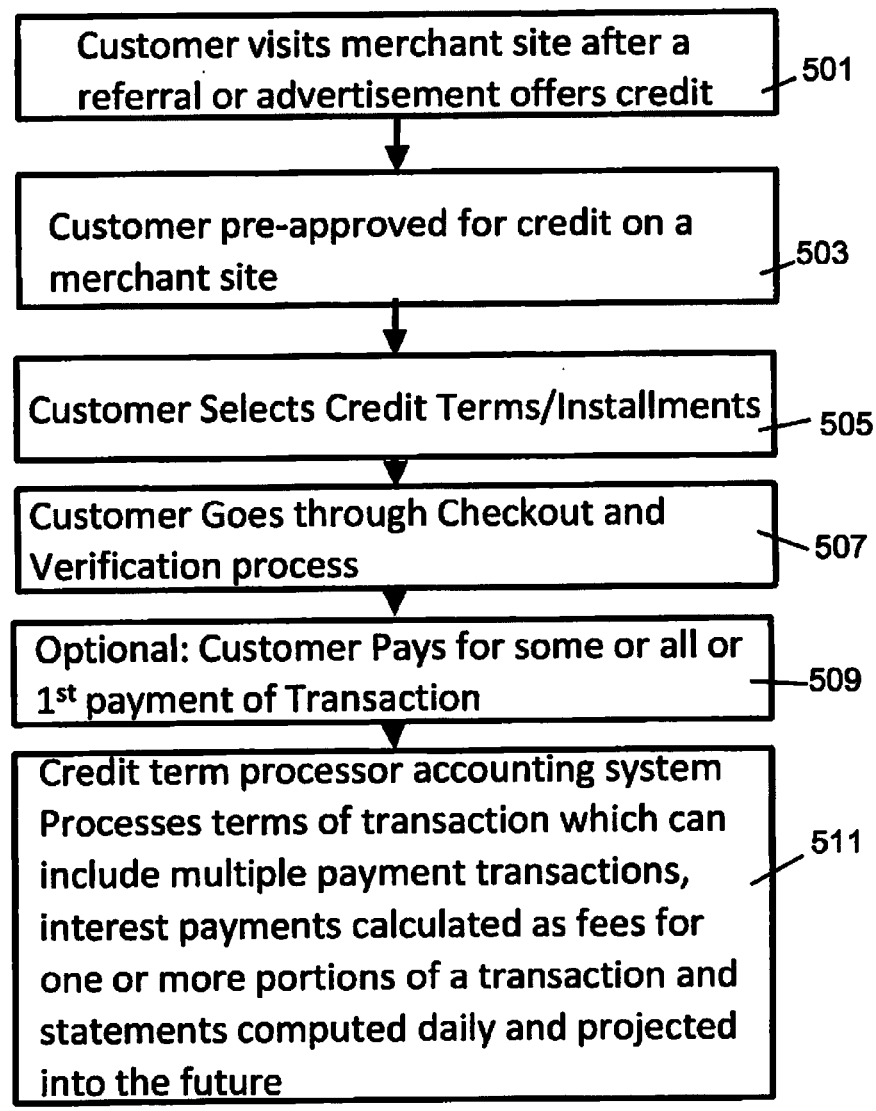
FIGS. 29, 30 and 31 illustrate flow charts showing sequences of steps for making credit based purchases using credit tools.
Figure 30:
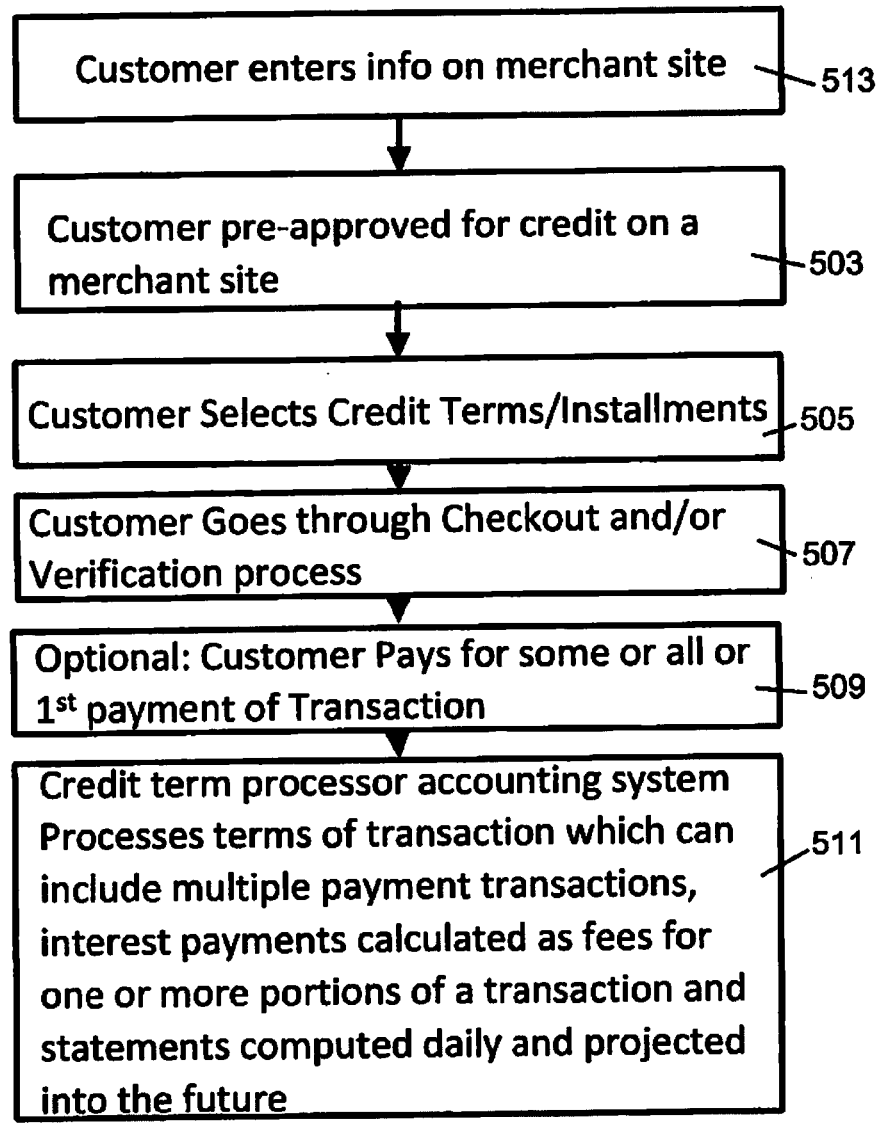

In different embodiments, various sequences of steps can be used to offer and process the credit. With reference to FIGS. 29 and 30, flow charts showing sequences of steps for making credit based purchases using the described credit tools are illustrated. A customer can first visit a merchant site after a referral or advertisement offering the customer credit 501. Alternatively, the customer can first enter information on a merchant site 513. The customer may then be pre-approved for credit on the merchant's website 503. The customer can select the credit terms and installment payment details 505. The customer can then go through the checkout and credit verification code processing 507 as described above. In an embodiment, the system can offer the customer an option of applying some or all of the credit offered to make a first payment to the purchase transaction 509. The system can include a credit term processor accounting system 511 that processes the terms of the purchasing transaction, which can include multiple payment transactions, interest payments calculated as fees for one or more portions of a transaction. The credit term processor accounting system 511 can also generate payment statements computed daily and projected into the future. Because the system is highly flexible and customizable, the customer may be able to configure a payment plan schedule or readjust the payment plan schedule to best fit the needs of the customer.

Figure 31:
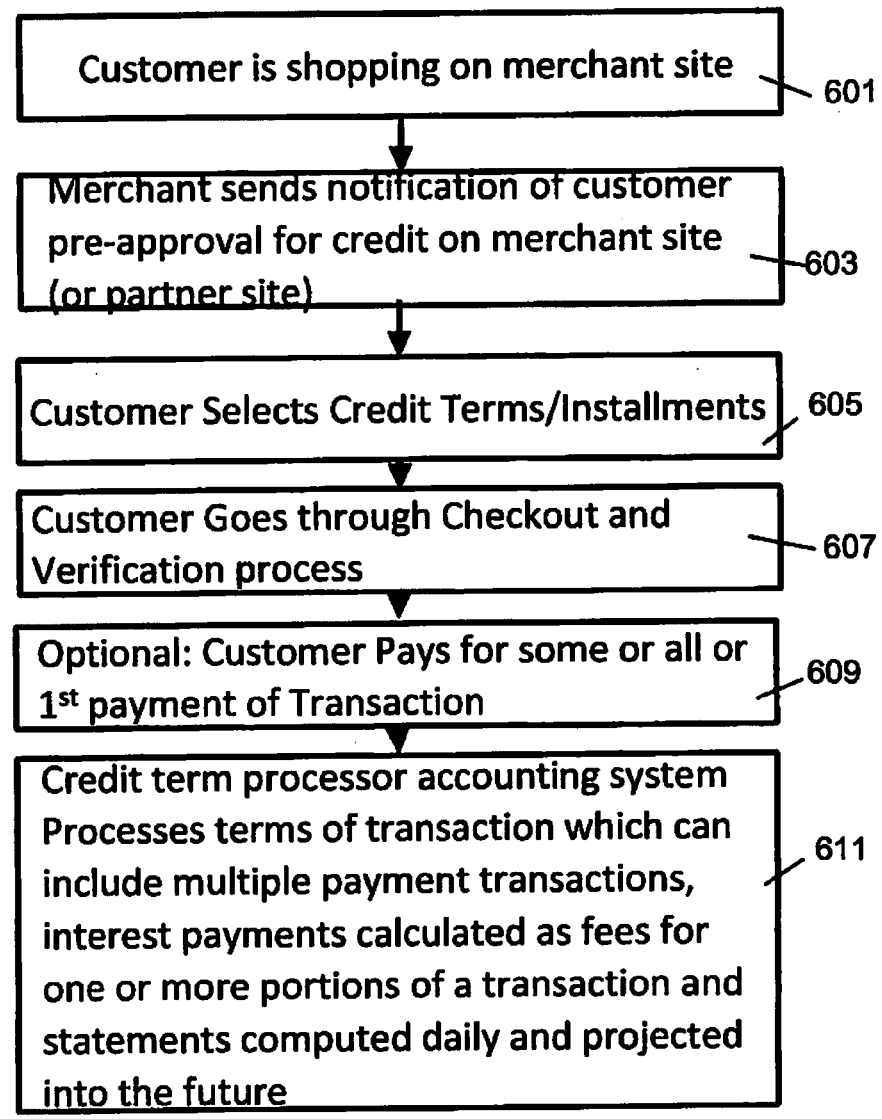

With reference to FIG. 31, a customer can be shopping on a merchant website 601. The merchant can send the customer a notification that the customer has been pre-approved for credit on the merchant side or a merchant partner's website 603. The customer can then click on a button, or the notification, to set the terms and installment payments for the offered credit 605. The customer can place items to be purchased in a virtual cart on the merchant's website and proceed through the checkout and verification process 607 as described above. The system may give the customer the option to pay for some or all of a first payment of the scheduled transaction 609. The system can include a credit term processor accounting system 611 that can compute daily and/or projected future payment statements and payment plan schedules that can best fit the needs of the customer. Although the flowcharts illustrated in FIGS. 29-31 illustrate a specific sequence of process steps, in other embodiments, the steps can be performed any suitable sequence to complete the purchase transaction.

Figure 32:
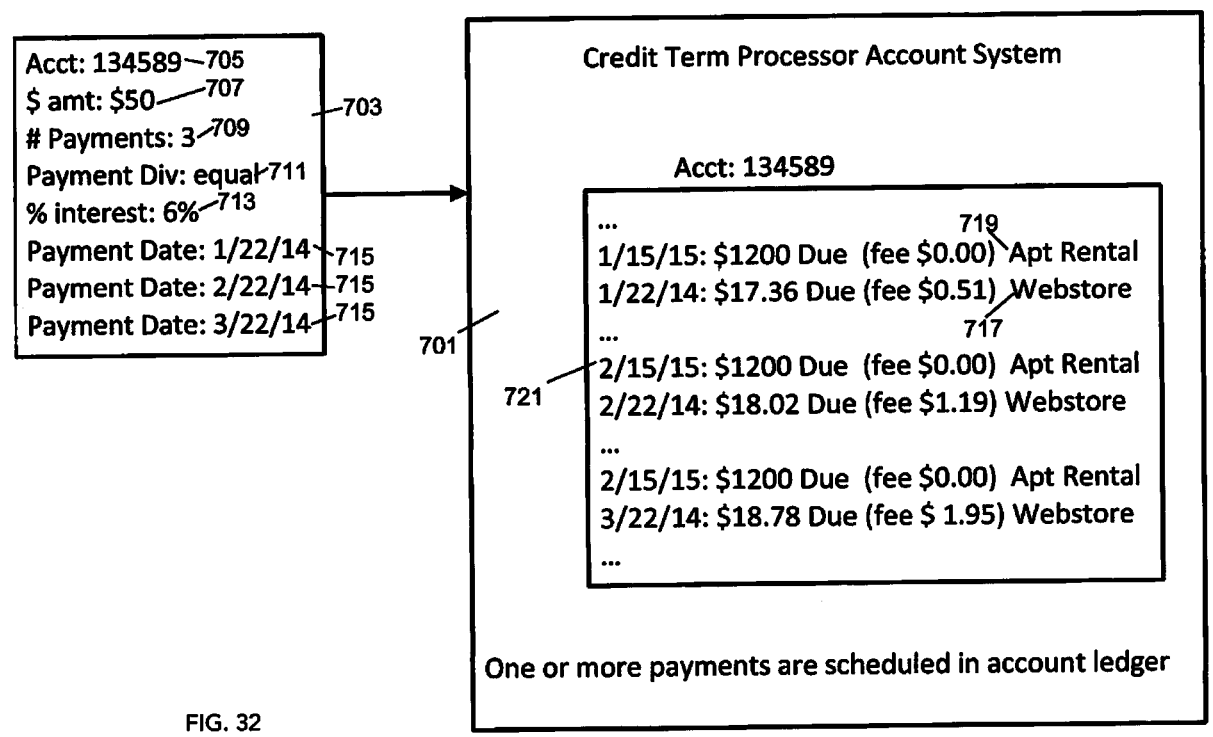
FIG. 32 illustrates a block diagram of an embodiment of a credit term processor accounting system for produce producing credit purchase statements.

With reference to FIG. 32, the credit term processor accounting system can produce statements 701 that can include credit purchase details and a chronological sequence of purchasing transaction payment due dates. The credit term processor accounting system can receive transaction data for purchases to produce the statements 701. For example, an individual purchase 703 can be described with information including: an account number 705 134589 and an $ amount 707 of $50. The repayment terms can indicate that the customer has 3 payments 709 in equal amounts 711 and the interest rate being charged 713 is 6% and the payment dates 715 are: Jan. 22, 2014, Feb. 22, 2014 and Mar. 22, 2014. The information for this individual purchase from a Webstore 717 can be combined with additional purchase information 719 for apartment rental in a cumulative report 721 that lists the repayment details of all purchases 717, 719 illustrated in chronological order. Since rent does not include any fees or interest, the payments represent the monthly $1,200 payment due with no fees. In contrast, the Webstore purchase payments for the dates are listed in Table 1 below and include interest fees:

TABLE 1

| Date | Payment Due | Fee |
| --- | --- | --- |
| Jan. 22, 2014 | $17.36 | $0.51 |
| Feb. 22, 2014 | $18.02 | $1.19 |
| Mar. 22, 2014 | $18.78 | $1.95 |

Figure 33:
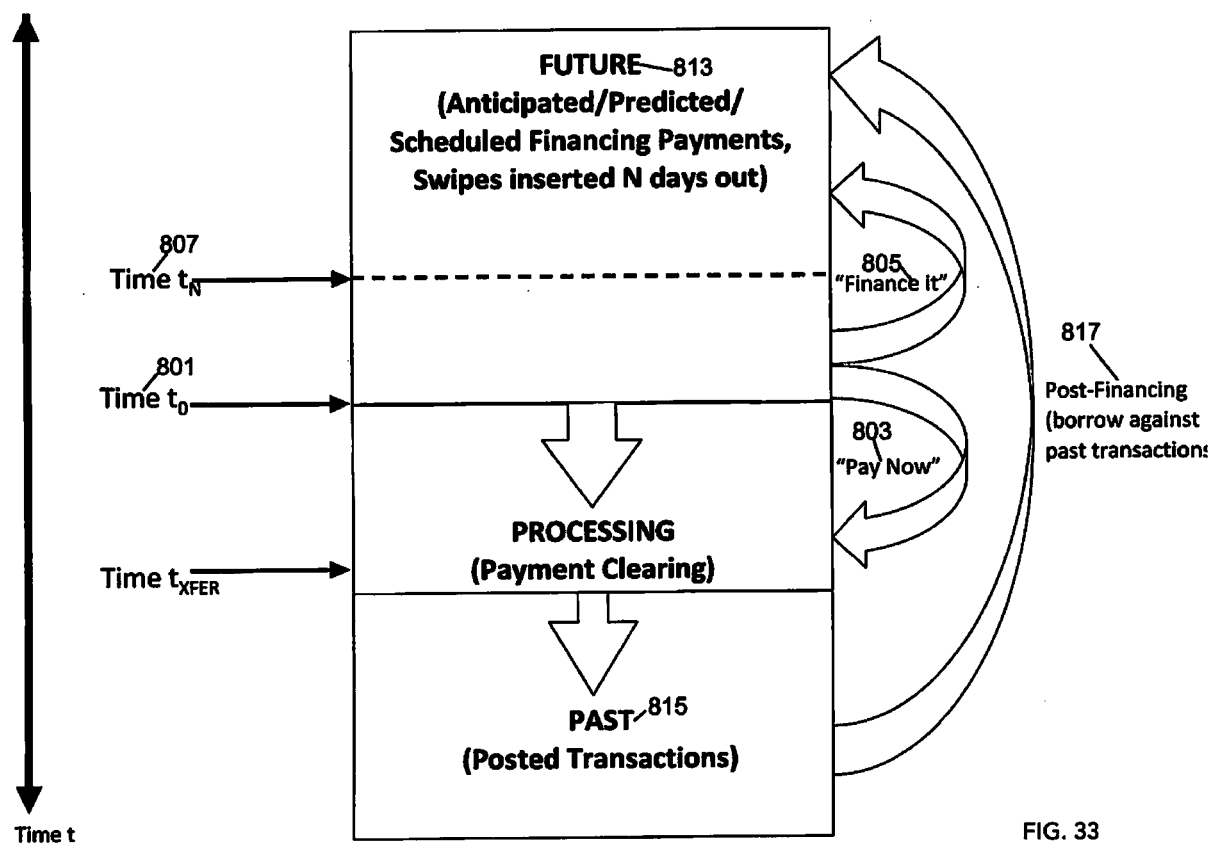
FIGS. 33-36 illustrate block diagrams of embodiments of credit term processor accounting systems used for current and past purchases.

With reference to FIG. 33, a graphical illustration of how the credit term processor accounting system can be used to pay for current and past purchases. In a first example, a customer may make a purchase at a current time, Time $t_0$ 801, and the customer may elect to pay for the purchase immediately in a "Pay Now" transaction 803 with payment clearing. Alternatively, the system can also be used to finance a purchase with credit in a "Finance it" transaction 805 with a payment for the purchase made in the future, Time $t_N$ 807. The payments can be made in the future 813 and scheduled based upon anticipated, predicted and/or scheduled financing payments with swipes inserted N days out. In yet another embodiment, the customer may have made a past transaction 815 which can be a posted transaction on a transaction statement. The customer may use the credit term processor accounting system to set up a post-financing credit 817 to borrow credit against a past transaction with future payments scheduled based upon anticipated, predicted and/or scheduled financing payments with swipes inserted N days out.

Figure 34:
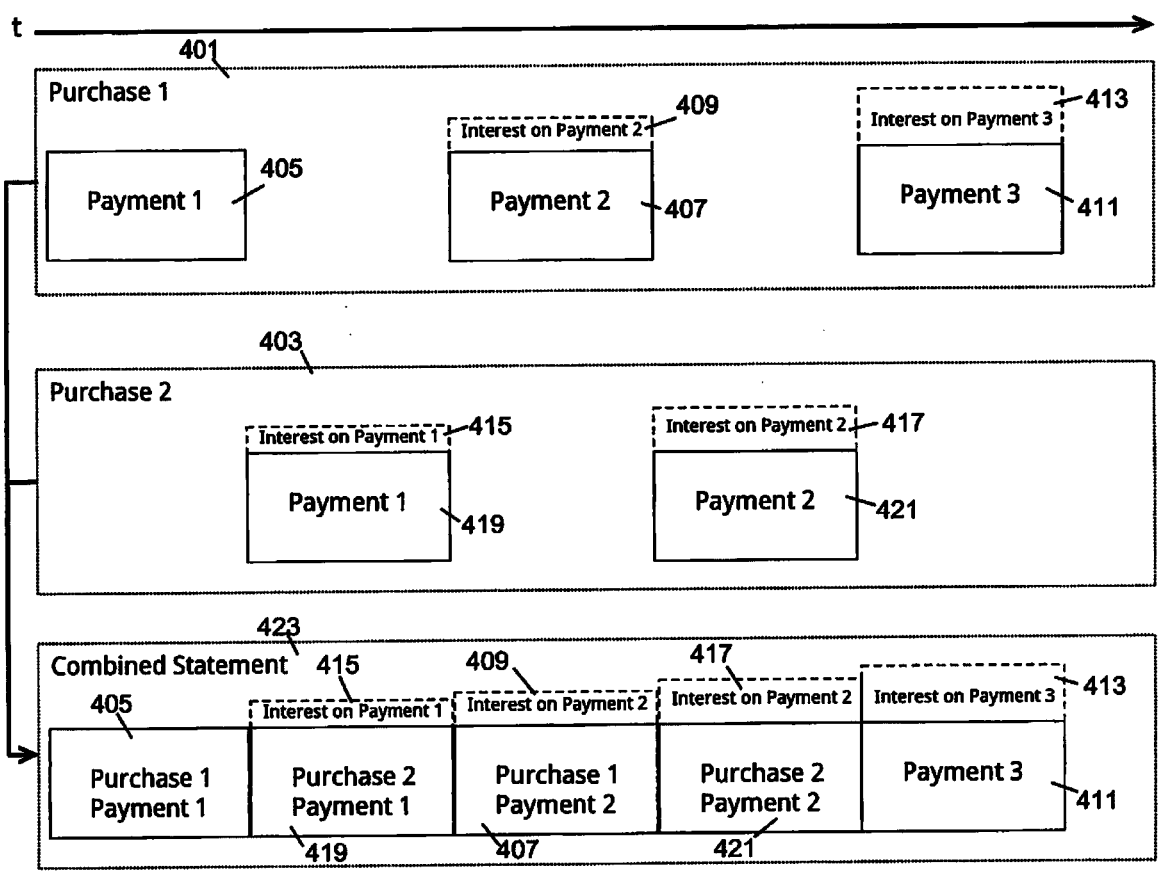
Figure 35:
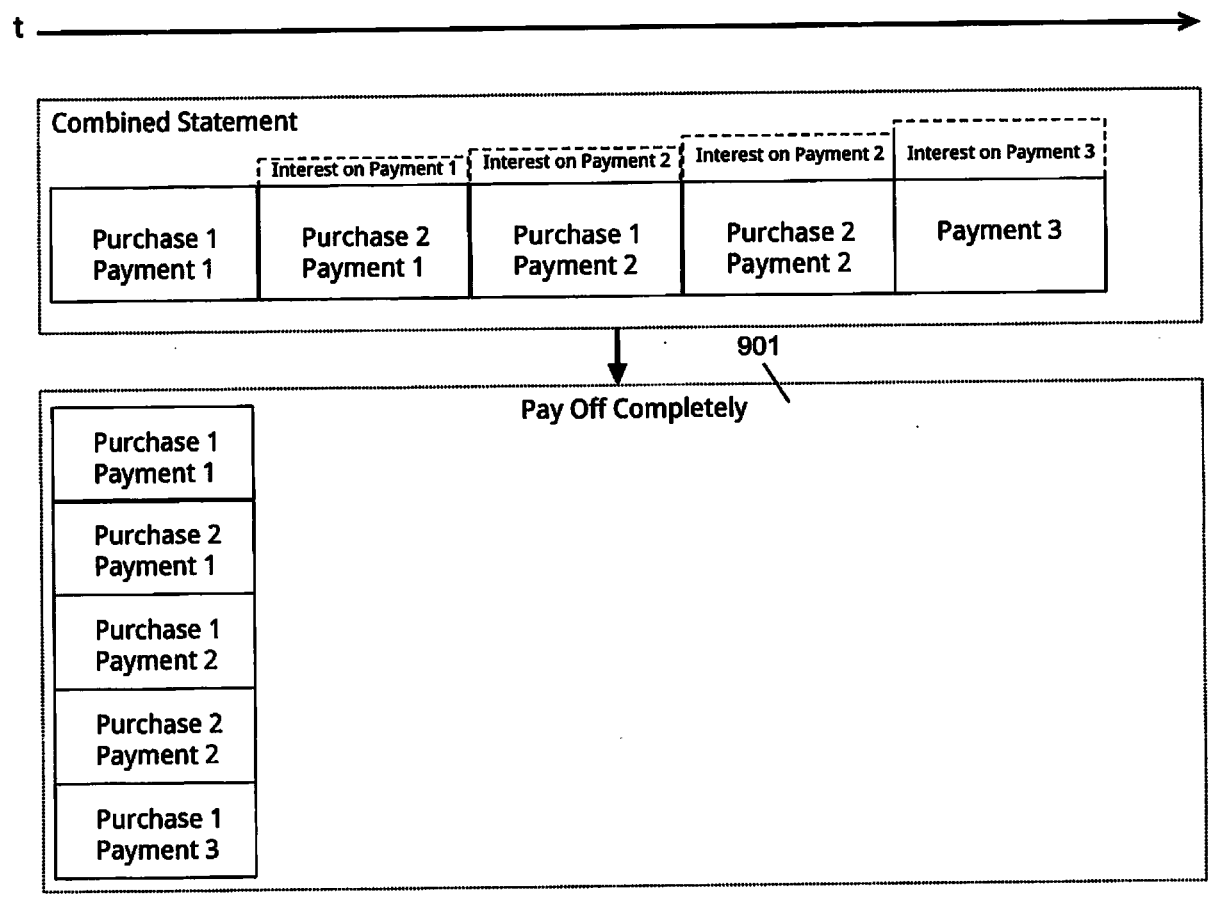

As discussed, the credit term processor accounting system can generate and process the financial payment schedules for multiple purchases in a single combined statement. With reference to FIG. 34, payment schedules for a first purchase 401 and a second purchase 403 are graphically illustrated. In this example, a first purchase 401, labeled "Purchase 1," can include three payments. The first payment 405 may be made at the time of purchase and therefore may not include an interest payment. A second payment 407 can include a second interest amount 409 based upon the second payment date and a third payment 411 can include a third interest amount 413 based upon the third payment date. Purchase 2 (403) can include two payments that both include interest amounts 415, 417 based upon the payment date of Purchase 1, Payment 2 (407) and Purchase 1, Payment 3 (411). Because the third payment 411 is made after the second payment 407 more time has elapsed and therefore the interest charged 413 on the third payments 411 is greater than the interest charged 409 on the second payments 407. Similarly, because the second payment 421 is made after the first payment 419, more time has elapsed and therefore the interest charged 417 on the second payment 421 is greater than the interest charged 415 on the first payment 419. The credit term processor accounting system can generate a combined statement 423 that includes both Purchase 1 (401) and Purchase 2 (403) with each of the payments and increased interest charged for each of the later payments. As shown in FIGS. 33-35, payments in the future will have larger interest payments on their individual amounts of principal, if the individual amounts of principal are identical.

Figure 38:
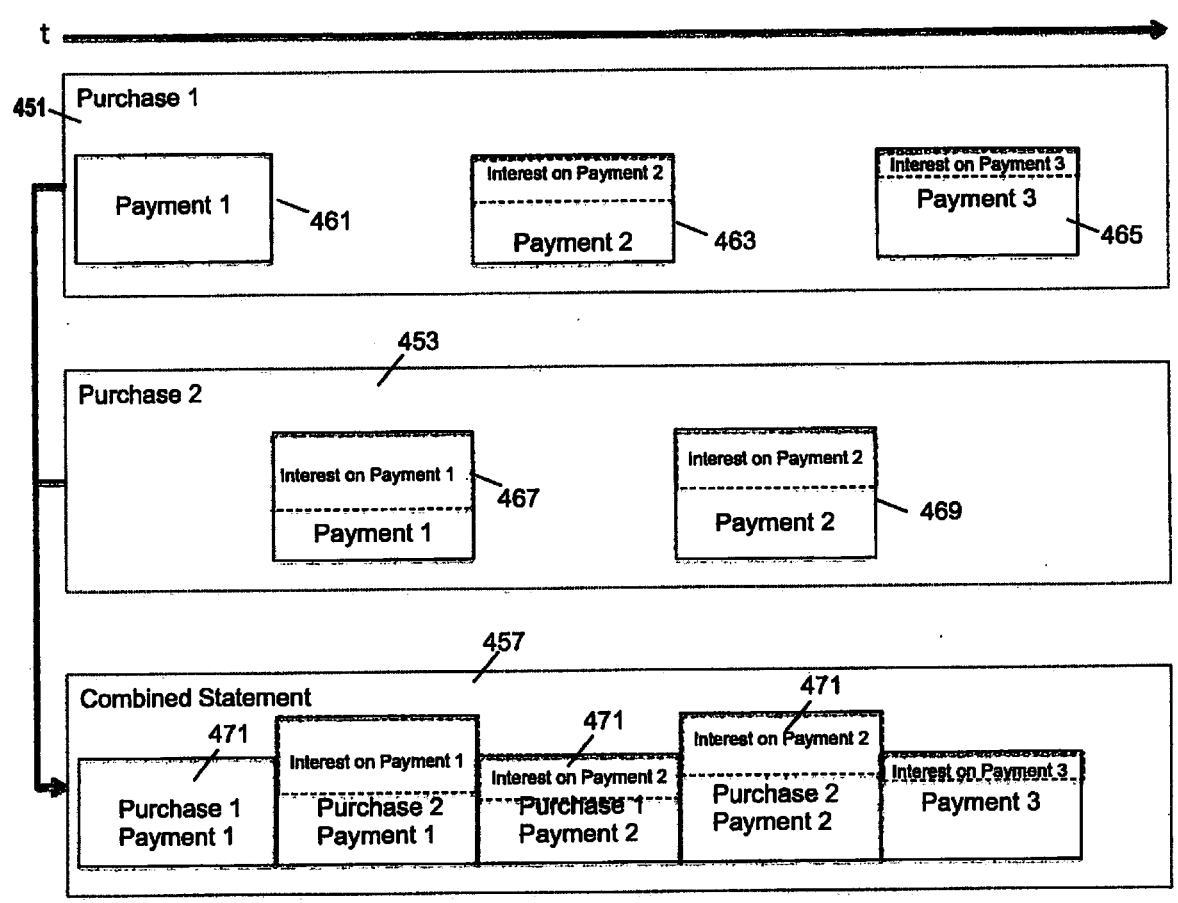
FIG. 38 illustrates a graphical representation of an embodiment of an embodiment of the credit term processor accounting system used to equalizing scheduled payments for purchases.

In another embodiment shown in FIG. 38 the inventive system can be configured to make the amounts of the payments equalized across all payment periods for multiple purchases. In this embodiment the interest portion of the payment will be higher relative to the principal portion of the payment for earlier payments and the interest portion will decrease as the principal is paid off with each payment. This process is illustrated graphically with a set of payments corresponding to purchase 1 shown as row 451, and a set of payments corresponding to purchase 2 shown as row 453 and a combined statement as row 455. The purchase 1 row 451 illustrates 3 payments used to purchase a first item. The payment 1 461 is made at the time of purchase and does not include any interest. In contrast the interest on payment 2 (463) is a significant portion of the entire payment 2. The interest in payment 3 (465) is a smaller percentage of the total payment 3. Similarly, for purchase 2, the interest on payment 1 (467) is a larger percentage of the total payment than the interest on payment 2 (469). The system can combine these purchases into a combined statement, and while each individual purchase can be divided into equal payments 471, these payments 471 on the combined statement can vary depending on the purchase size, number of payments and the creditworthiness of the parties involved in the transaction.

Figure 39:
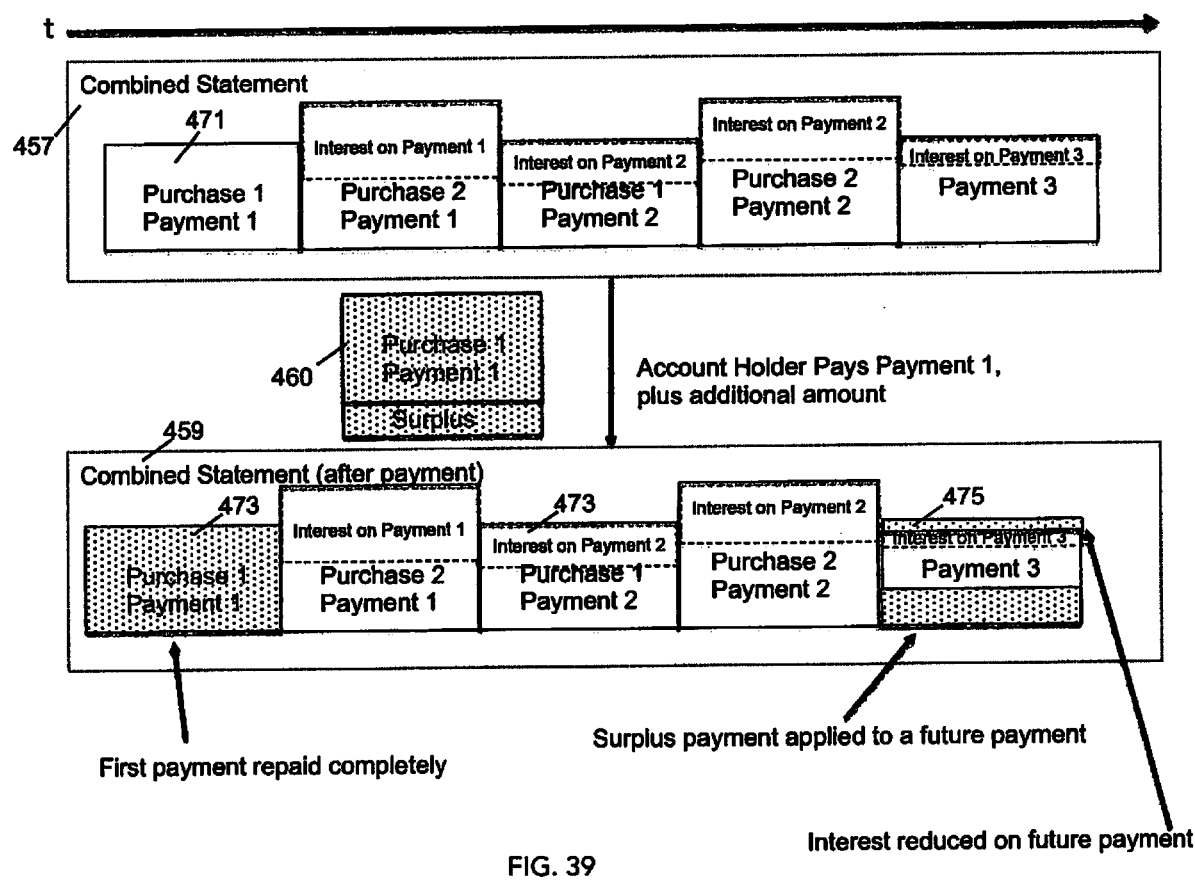
FIG. 39 illustrates a graphical representation of an embodiment of an embodiment of the credit term processor accounting system used to apply extra payments to reduce future scheduled payments.

In an embodiment, the system may be flexible enough to allow for additional payments in addition to the scheduled payments to reduce the amount owed later on the purchases. With reference to FIG. 39, the combined statement 457 lists a plurality of payments 471 as shown in FIG. 38. When Purchase 1 Payment 1 is repaid completely with some surplus 460, the surplus payment can be applied to the Purchase 1 Payment 3 (the final payment) and reduces the interest due on this payment due to the lower principal carried in the 3$^{rd}$ payment period. Thus, in the combined statement 459 after the payment 460, the last payment 475 is reduced based upon the surplus payment from 460 and is now lower than the rest of the payments 473.

The scheduled payments for Purchase 1 401 and Purchase 2 403 are illustrated in a graphical manner with the principle shown as solid blocks and the interest shown as blocks defined by dotted lines. The volumes of the principle and interest blocks can be proportional to their dollar values. Thus, in this example since the principal values are all the same, the principal blocks are all the same size. In contrast, the interest payments increase with time, so the interest blocks can increase in size with more elapsed time. Since there is no interest with payment 1 of purchase 1 (405), there is no interest block.

With reference to FIG. 35, the credit term processor accounting system can also produce modified reports that can instantaneously calculate the cost to pay off the "Purchase 1" and "Purchase 2" at the current or any future date. In the illustrated example, the credit term processor accounting system can calculated the cumulative cost of paying off the total purchase 901 at the time of purchase so that customer can use these calculations to make an informed decision between paying off the purchases at any give time with reduced interest or paying for "Purchase 1" and "Purchase 2" according to the scheduled payment plan with interest. In the illustrated example 901, the cumulative payments for Purchase 1 and Purchase 2 are listed without any interest payments if the customer can pay off the purchases at the time of the purchase.

Figure 36:
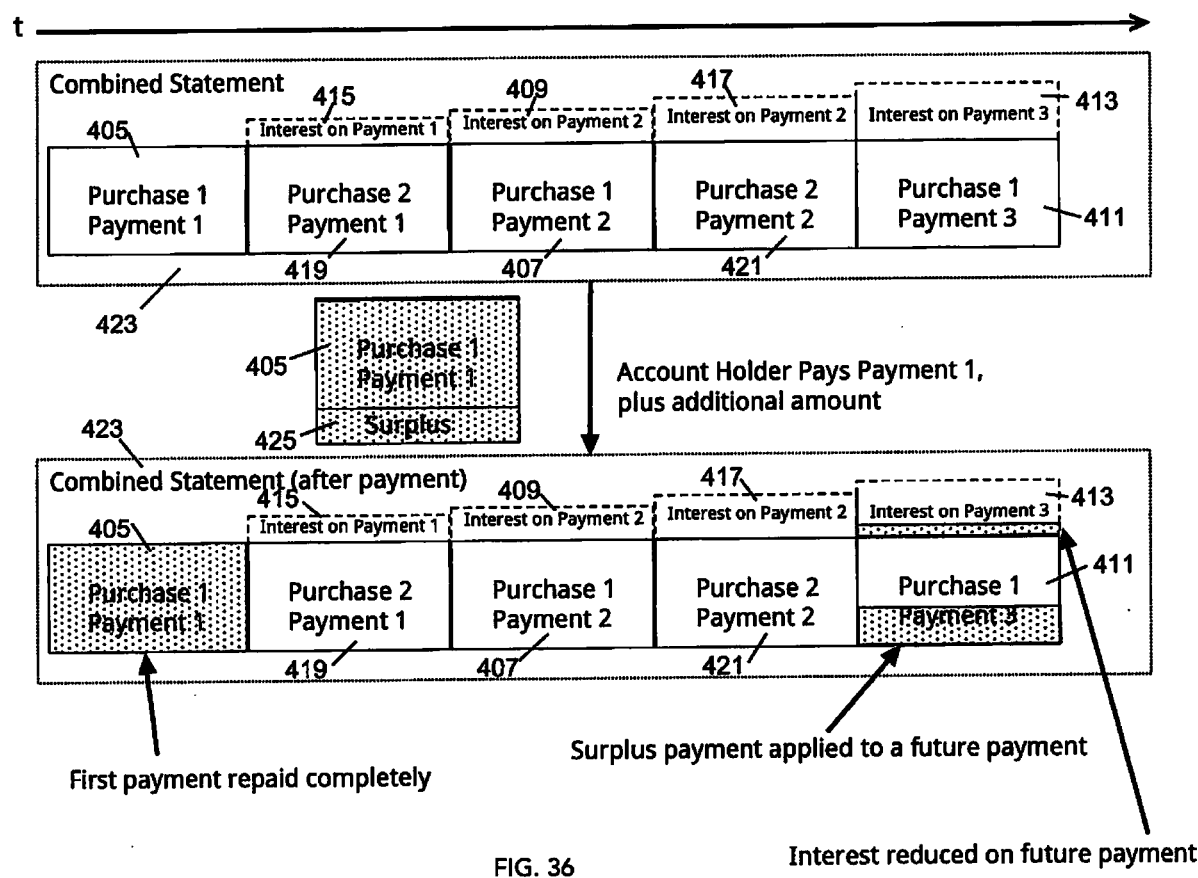

In other embodiments, it may be desirable to make a larger than scheduled payment but not payoff the entire balance. With reference to FIG. 36, the credit term processor accounting system is configured to graphically illustrate the reduction in a future scheduled purchase by paying more than the scheduled payment. In this example, the customer has made the Payment 1 for Purchase 1 (405) and also paid some additional money 425, which will be credited to the last scheduled Payment 3 (411) for Purchase 1. In this embodiment, the Payment 1 (405) is illustrated with a box that matches the size and shape of the scheduled Purchase 1, Payment 1 (405) and the Surplus block 425 is adjacent to the payment block 405. The size of the payment and surplus boxes can be proportional to the dollar values of each. When the payment and surplus are applied to the combined statement 423, the payment fills the scheduled Purchase 1 Payment 1 block 405. The surplus payment is applied to the last scheduled Purchase 1 Payment 3 block 411 and graphically illustrated by partially filling this block as well as partially filling the Interest on Payment 3 block 413. If the surplus completely filled the Purchase 1, Payment 3 block 411, any remaining surplus could be applied to the Purchase 2, Payment 2 block 421 and the interest on Payment 2 block 417.

With reference to FIG. 37, in an alternate embodiment, the credit term processor accounting system can produce statements 551 that can list purchases and provide purchasing information that can include: purchase date 553, merchant or payment recipient 555, transaction verification code 557 and the amount of credit paid or used 559. It can be desirable to graphically illustrate the payments made for specific purchases. In this example, the customer made a purchase of $4.90 from Brett's Beanie Babies 561 and a purchase of $12.92 from Alex's Air Drums 563. The cumulative purchase is $17.82 and the statement also shows a Visa payment of $17.82 565. In order to show the relationship between the purchases and the payment, the system can show a line and dots 567 to represent the payment for these purchases. In other embodiments, any other graphical mechanism can be used to illustrate this relationship.

The optimal choice for how to extend credit may vary by merchant, by product, by customers, by culture, by region or any other parameter. Optimal parameters can be configured by testing and customization according to how customers respond to being granted different levels of credit at different points in the purchasing process. In an embodiment, the system may be able to measure customer trends. This data can be used for predicting future behavior. For example, are customers more likely to spend more with more credit? However, are they also more likely to miss payments to repay the higher credit? The system may also be able to track whether the customer is only spending up to their budget, or whether the customer is just spending more, and how the customer feels about having additional credit. Does the receipt of extended credit, or having more credit than credit cards result in a change in behavior? Again, these customer reactions can result in refinements to the system, which can have the desired result of providing additional funds to customers and increasing purchasing power.

The examples and illustrations included herein show, by way of illustration and not of limitation, specific embodiments in which the subject matter may be practiced. Other embodiments may be utilized and derived therefrom, such that structural and logical substitutions and changes may be made without departing from the scope of this disclosure. As a person skilled in the art will recognize from the previous detailed description and from the figures, modifications and changes can be made to the preferred embodiments of the invention without departing from the scope of this invention.

What is claimed is:

1. A method for displaying customized loan information for purchasing an item in a network in communications with a finance server, a merchant server and a client computer, the method comprising:
   providing instructions to the client computer to display a selectable interest control option on a user interface of the client computer;
   responsive to client selection of the selectable interest control option, providing instructions to the client computer to display, on the user interface of the client computer, an interest control user interface, the interest control user interface simultaneously providing a plurality of selectable values for each of interest rate, loan amount and payment duration, the selectable values for the payment duration and the loan amount being displayed as possible values corresponding to a client selection of a selected interest rate;
   based on receipt of client personal information, the selected interest rate, a selected loan amount, and a selected number of payments, obtaining credit risk information for the client;
   providing instructions to the client computer to display a credit decision to offer credit to the client by the finance server based upon the credit risk information;
   providing instructions to the client computer to display approval of the selected loan amount; and
   receiving acceptance of the loan terms from the client computer for the selected loan amount,
   wherein the interest control user interface simultaneously provides a first slider button showing the selectable values of the interest rate, a second slider button showing the selectable values of the loan amount, and a third slider button showing the selectable values of the payment duration along with simultaneously displaying:
   the selected interest rate, a payment amount for each of the selected number of payments at the selected interest rate, and a total interest to be paid at the selected interest rate.

2. The method of claim 1 further comprising:
   displaying value controls for selection of the loan terms and acceptance of the loan terms from the client computer.

3. The method of claim 1 further comprising:
   displaying on the client computer an input for a request for revised loan terms with an additional down payment;
   displaying on the client computer, revised loan terms for a purchase price for the item; and
   displaying on the client computer an input for selection of the revised loan terms and acceptance of the loan terms.

4. The method of claim 1 further comprising:
   displaying an input for a debit card number on the client computer; and
   transmitting, to the client computer, the debit card number associated with an account having funds to be used for a portion of a purchase price required for the selected loan amount.

5. The method of claim 1 further comprising:
   displaying loan repayment information on the client computer; and
   receiving by the finance server, the loan repayment information from the client computer.

6. The method of claim 1 wherein the client information includes: a mobile telephone number associated with the client, a legal name of the client, social network account information of the client, a birthday of the client or at least a portion of a social security number of the client.

7. The method of claim 1, wherein the interest control user interface further provides a fourth slider button showing selectable values for a number of payments, and a fifth slider button showing selectable values for a payment interval.

8. A method for displaying loan information for purchasing an item in a network in communications with a finance server, a merchant server and a client computer, the method comprising:
   displaying on a user interface of the client computer a selectable interest control option;
   responsive to client selection of the selectable interest control option, displaying on a user interface of the client computer, an interest control user interface that presents a plurality of selectable values for each of interest rate, loan amount and payment duration proximate to each other, the selectable values for the payment duration and the loan amount being presented as possible values corresponding to a client selection of a selected interest rate;
   based on receipt of client personal information, the selected interest rate, a selected loan amount, and a selected number of payments, obtaining credit risk information by the finance server for the client;
   displaying on the client computer a credit decision to offer credit to the client by the finance server based upon the credit risk information;
   displaying on the client computer approval of the selected loan amount;
   displaying on the client computer a description of the item to be purchased, the purchase price, a loan value and first loan terms for a first portion of the purchase price that is less than the purchase price;
   displaying on the client computer an input for additional information for the client; displaying on the client computer a description of the item to be purchased, the purchase price, a second loan value and second loan terms for a second portion of the purchase price that is less than the purchase price and a credit balance wherein the total loan approval value is greater than the second loan value;
   receiving by the finance server, acceptance of the second loan terms from the client computer to complete the purchase of the item; and
   transmitting a first payment for the second portion of the purchase price to the merchant server,
   wherein the interest control user interface simultaneously provides a first slider button showing the selectable values of the interest rate, a second slider button showing the selectable values of the loan amount, and a third slider button showing the selectable values of the payment duration along with simultaneously displaying:
   the selected interest rate, a payment amount for each of the selected number of payments at the selected interest rate, and a total interest to be paid at the selected interest rate.

9. The method of claim 8 further comprising:

displaying the first loan terms on a display of a mobile phone, wherein the client computer is the mobile phone; and displaying adjustments to the loan terms on the mobile phone.

10. The method of claim 8 further comprising:

receiving by the merchant server, a second payment equal to a difference between the purchase price and the second portion of the purchase price of the loan terms from the client computer.

11. The method of claim 8 further comprising:

receiving by the finance server, loan repayment information from the client computer.

12. The method of claim 8 further comprising:

inputting to the user interface of the client computer: a birthday of the client or at least a portion of a social security number of the client.

13. The method of claim 8, wherein the interest control user interface further provides a fourth slider button showing selectable values for a number of payments, and a fifth slider button showing selectable values for a payment interval.

14. A method for displaying customized loan information in a network in communications with a finance server, a merchant server and a client computer, the method comprising:

displaying on a user interface of the client computer a selectable interest control option;

responsive to client selection of the selectable interest control option, displaying on a user interface of the client computer, an interest control user interface that presents a plurality of selectable values for each of interest rate, loan amount and payment duration, the selectable values for the payment duration and the loan amount being presented as possible values corresponding to a client selection of a selected interest rate;

based on receipt of client personal information, the selected interest rate, a selected loan amount, and a selected number of payments, obtaining credit risk information for the client;

displaying on the client computer a credit decision to offer credit to the client by the finance server based upon the credit risk information;

displaying on the client computer approval of the selected loan amount;

displaying on the client computer an input for accepting the loan terms; and displaying on the client computer the loan terms which were selected, wherein the interest control user interface simultaneously provides a first slider button showing the selectable values of the interest rate, a second slider button showing the selectable values of the loan amount, and a third slider button showing the selectable values of the payment duration along with simultaneously displaying:

the selected interest rate, a payment amount for each of the selected number of payments at the selected interest rate, and a total interest to be paid at the selected interest rate.

15. The method of claim 14 wherein the loan terms are displayed on the user interface on a touch screen of the client computer and wherein the user interface includes controls for adjusting the loan terms.

16. The method of claim 14 wherein the loan terms are displayed on the user interface on a touch screen of the client computer and wherein the user interface includes slide controls for adjusting the loan terms.

17. The method of claim 14 wherein the loan terms are displayed on the user interface on a touch screen of the client computer and wherein the loan terms include an amount of a loan and a number of payments.

\* \* \* \* \*